US011646588B2

(12) United States Patent
Sun et al.

(10) Patent No.: US 11,646,588 B2
(45) Date of Patent: May 9, 2023

(54) BATTERY SYSTEM, CONTROL METHOD OF CELL BALANCE PROCEDURE, AND CALCULATION METHOD OF BALANCE CHARGE CAPACITY

(71) Applicant: INDUSTRIAL TECHNOLOGY RESEARCH INSTITUTE, Hsinchu (TW)

(72) Inventors: Chein-Chung Sun, Kaohsiung (TW); Chun-Hung Chou, Tainan (TW); Chi-Hua Chen, Zhubei (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 303 days.

(21) Appl. No.: 17/136,886

(22) Filed: Dec. 29, 2020

(65) Prior Publication Data
US 2021/0328441 A1    Oct. 21, 2021

(30) Foreign Application Priority Data

Apr. 16, 2020   (TW) .................................. 109112863

(51) Int. Cl.
*H02J 7/00*       (2006.01)
(52) U.S. Cl.
CPC ...... *H02J 7/0019* (2013.01); *H02J 7/007182* (2020.01); *H02J 7/007194* (2020.01)
(58) Field of Classification Search
CPC .............. H02J 7/0019; H02J 7/007194; H02J 7/007182
See application file for complete search history.

(56) References Cited

U.S. PATENT DOCUMENTS 9,525,269 B2   12/2016  Yoshida
10,594,146 B2   3/2020  Shibata
(Continued)

FOREIGN PATENT DOCUMENTS

CN       201629586 U      11/2010
CN       101976876 A       2/2011
(Continued)

OTHER PUBLICATIONS

Anderson et al., "Life Balancing—A Better Way to Balance Large Batteries", SAE Technical Paper, Mar. 28, 2017, pp. 1-6.
(Continued)

*Primary Examiner* — Drew A Dunn
*Assistant Examiner* — Pamela J Jeppson
(74) *Attorney, Agent, or Firm* — Birch, Stewart, Kolasch & Birch, LLP

(57) ABSTRACT

A battery system, a control method of a cell balance procedure and a calculation method of a balance charge capacity are provided. The battery system includes a plurality of battery units, a communication bus and a host control unit. Each battery unit includes a plurality of cells, an isolated charger, a switch array circuit, a balance slave switch and a balance slave controller. The host control unit includes a balance host controller, a balance host switch and a system current measurement unit. When the error between a balance detection voltage calculated by each balance slave controller and the balance detection voltage calculated by the balance host controller is less than a predetermined value, the balance host switch and the corresponding balance slave switches are in conduction and the specified plurality cells of battery system are charged for keeping cell balance purpose.

19 Claims, 17 Drawing Sheets

(56) References Cited

U.S. PATENT DOCUMENTS

| | | | |
|---|---|---|---|
| 2014/0009092 A1* | 1/2014 | Ma | H01M 10/441 320/108 |
| 2015/0295425 A1 | 10/2015 | Bryngelsson et al. | |
| 2017/0256825 A1* | 9/2017 | Sun | H02J 7/0029 |

FOREIGN PATENT DOCUMENTS

| | | |
|---|---|---|
| CN | 104852435 A | 8/2015 |
| CN | 106787031 B | 3/2019 |
| CN | 106972206 B | 3/2020 |
| JP | 6584798 B2 | 10/2019 |
| TW | 200522411 A | 7/2005 |
| TW | I520409 B | 2/2016 |
| TW | 201624817 A | 7/2016 |
| TW | I646750 B | 1/2019 |

OTHER PUBLICATIONS

Chen et al., "System-Theoretic Analysis of a Class of Battery Equalization Systems: Mathematical Modeling and Performance Evaluation", IEEE Transaction on Vehicular Technology, vol. 64, No. 4. Apr. 2015, pp. 1445-1457.

Ju et al., "Performance Evaluation of Modularized Global Equalization System for Lithium-Ion Battery Packs", IEEE Transactions on Automation Science and Engineering, vol. 13, No. 2, Apr. 2016, pp. 986-996.

Liu et al., "New Type Equalization Circuit and Management System of Li-ion Battery", 11th IEEE International Conference on Control & Automation (ICCA), Taichung, Taiwan, Jun. 18-20, 2014, pp. 1056-1060.

Qinhuang et al., "An Equalization Management Systems for Lithium-ion Batteries in Energy Storage System", Proceedings 2013 International Conference on Mechatronic Sciences, Electric Engineering and Computer (MEC), Shenyang, China, Dec. 20-22, 2013, pp. 3355-3358.

Scott et al., "Active Battery Cell Balancing", Analog Devices, pp. 1-4.

* cited by examiner

BATTERY SYSTEM, CONTROL METHOD OF CELL BALANCE PROCEDURE, AND CALCULATION METHOD OF BALANCE CHARGE CAPACITY

This application claims the benefit of Taiwan application Serial No. 109112863, filed Apr. 16, 2020, the disclosure of which is incorporated by reference herein in its entirety.

TECHNICAL FIELD

The disclosure relates in general to a battery system, a control method of a cell balance procedure, and a calculation method of a balance charge capacity.

BACKGROUND

The issue of air pollution is gaining more and more attention, and the call to replace petrochemical energy has spurred the development of the oil-electric hybrid or pure electric vehicle industry, in which the battery pack is an indispensable key component. At present, battery systems are mostly composed of series and parallel cells with small volume and output voltage. In practical applications, due to the non-linear characteristics of the electrochemical characteristics and internal resistance between the cells, the operating environment conditions also cause the cells to have different electrical properties. When these cells are used in series or parallel, some cells may have been overcharged while charging, but some cells are not fully charged. The use of overcharge and over-discharge for a long time will cause unexpected wear on the battery system, which will accelerate the degradation of the cells, thereby reducing the safety and service life of the battery system. The above phenomenon is called the battery system balance problem or the battery system equalization problem in the field of general battery management systems.

In order to increase battery durability, battery management systems may use balancing technology. The main purpose of the balancing technology (also called equalization technology) is to use a separate circuit to charge and discharge the cells of the battery system during the use of the series or parallel cells. The capacity or voltage difference among the cells should be reduced as much as possible. The balancing technology can be divided into non-dissipative (also called active) balancing technology or dissipative (also called passive) balancing technology. The active balancing technology uses energy storage elements such as capacitors or inductors to move energy between different cells, while the passive balancing technology uses resistors to discharge different cells.

SUMMARY

The disclosure is directed to a battery system, a control method of a cell balance procedure, and a calculation method of a balance charge capacity.

According to one embodiment, a battery system is provided. The battery system includes a plurality of battery units, a communication bus, and a host control unit. Each of the battery units includes a plurality of cells, an isolated charger, a switch array circuit, a balance slave switch and a balance slave controller. The isolated charger is configured to provide a balance charge capacity to each of the cells, for performing a cell balance procedure. The switch array circuit is disposed between the cells and the isolated charger. The balance slave switch is connected between the isolated charger and a balance power supply. The balance slave controller is configured to calculate a balance detection voltage. The balance detection voltage is used for calculating the balance charge capacity. The balance slave controller is further configured to control the switch array circuit, such that the isolated charger performs the cell balance procedure for one of the cells. The communication bus is connected to the battery units. The host control unit includes a balance host controller, a balance host switch and a system current measurement unit. The balance host controller is connected to the communication bus. The balance host controller and the balance slave controllers interactively transfer battery information via the communication bus, and the balance host controller is further configured to calculate the balance detection voltage. The balance host switch is for controlling the balance power supply and the balance host switch is controlled by the balance host controller. The system current measurement unit is configured to measure a system current passing through the battery units which are series connected, and multiply the system current by a time to obtain a system capacity. When all of the battery units meet an activation condition, the balance host controller turns on the balance host switch to conducting state. The balance slave switch of each battery unit is turned on to conducting state by the balance slave controller corresponding thereto when a difference between the balance detection voltage calculated by the balance slave controller and the balance detection voltage calculated by the balance host controller is less than a predetermined value. One of the battery units is applied cell balance power when both of the balance slave switch thereof and the balance host switch are turned on to conducting state. When the cell balance procedure is being performed and the balance host controller detects the data packet transferred delay from the balance slave controller, the balance host controller turns off the balance host switch to non-conducting state (equivalent to cut-off the balance power supply). When one of the balance slave controllers detects the data packet transferred delay from the balance host controller, the balance slave controller turns off the balance slave switch corresponding thereto to non-conducting state (equivalent to cut-off the balance power supply for the isolated charger).

According to another embodiment, a calculation method of a balance charge capacity is provided. For balancing a plurality of cells of a battery system, the balance charge capacity is provided for one of the cells. The cells have a highest voltage and a lowest voltage. The calculation method includes the following steps. A register data in the cell balance procedure is reset when the highest voltage rises to a balance reset voltage. A voltage difference between the highest voltage and the lowest voltage is calculated when the highest voltage rises to a balance trigger voltage. A balance detection voltage is obtained by subtracting a product of the voltage difference and a safety factor from a single cell constant voltage charging set value. The single cell constant voltage charging set value is a charging voltage limitation when the cell is charging from a constant current charging mode (CC mode) to a constant voltage charging mode (CV mode). A system capacity of the battery system is recorded as a first capacity when the highest voltage rises to the balance detection voltage. The system capacity of the battery system is recorded as a second capacity when voltage of any one of the cells raises the balance detection voltage. A difference between the first capacity and the second capacity is calculated to obtain the balance charge capacity.

According to an alternative embodiment, a control method of a cell balance procedure of a battery system is provided. The battery system includes a plurality of battery units, a communication bus and a host control unit. Each of the battery units includes a plurality of cells, an isolated charger, a switch array circuit, a balance slave switch, a balance slave controller, and a balance current measurement unit. The isolated charger is configured to provide a balance charge capacity to each of the cells, for performing the cell balance procedure. The switch array circuit is disposed between the cells and the isolated charger. The balance slave switch is connected between the isolated charger and a balance power supply. The balance slave controller is configured to calculate a balance detection voltage. The balance detection voltage is used for calculating the balance charge capacity. The balance slave controller is further configured to control the switch array circuit, such that the isolated charger performs the cell balance procedure for one of the cells. The balance current measurement unit measures a current of each of the cells. The balance charge capacity is a product of the current of each of the cells and a time. The communication bus is connected to the battery units via the balance slave controller. The host control unit includes a balance host controller, a system current measurement unit and a balance host switch. The balance host controller is connected to the communication bus. The balance host controller and the balance slave controller interactively transfer battery information via the communication bus. The balance host controller is further configured to calculate a system current, a system capacity, and the balance detection voltage. The balance host switch is connected to the balance host controller. The control method includes the following steps. The balance host controller turns on the balance host switch to conducting state when all of the battery units meet an activation condition. Each balance slave controller turns on the balance slave switch corresponding thereto to conducting state when a difference between the balance detection voltage calculated by the balance slave controller and the balance detection voltage calculated by the balance host controller is less than a predetermined value. The balance host controller turns off the balance host switch to non-conducting state and keeps the battery system in a pause balance state until repaired when the balance host controller detects data packet transferred delay from the balance slave controllers. Each balance slave controller turns off its balance slave switches to non-conducting state and keeps the battery system at the pause balance state until repaired when the balance slave controller detects the data packet transferred delay from the balance host controller.

Figure 1A:
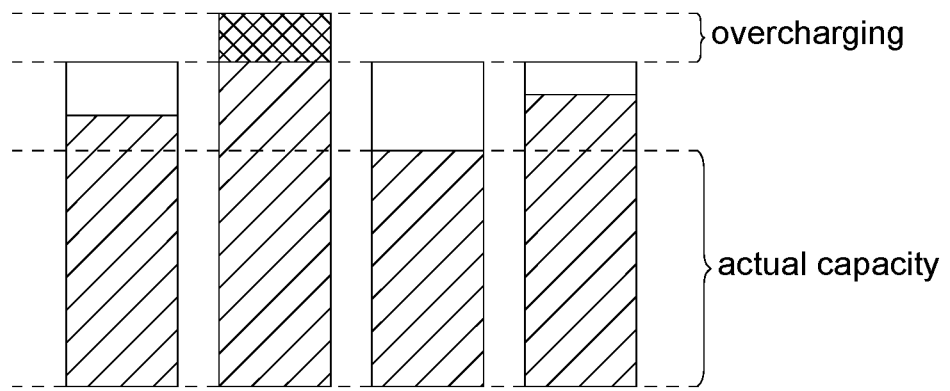
FIG. 1A is a schematic diagram of the unbalanced capacities.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DETAILED DESCRIPTION

Please refer to FIG. 1A, which is a schematic diagram of the unbalanced capacities. As shown in the diagonal shading region of FIG. 1A, the characteristics of the four cells are all the same and are used in series. However, due to the uneven remaining capacities and self-discharge of the cells, the uneven voltages of the cells of battery system are generated. Therefore, during the charging process, the voltage of the cell with a higher capacity is higher than others. When the cell occurs overcharging status, it may lead to safety and degradation problems such as the cell thermal runaway or accelerated degradation. During the discharge process, the entire battery system can only release the capacity equal to the remaining capacity of the cell with the lowest voltage, resulting in varying degrees of capacity loss for the cells of battery system.

Figure 1B:
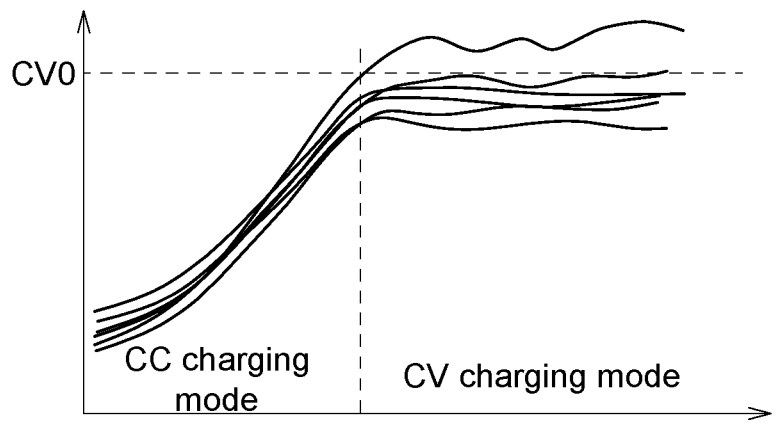
FIG. 1B is a schematic diagram of a cell balance procedure according to an embodiment in which a plurality of cells is connected in series.
Figure 1B:
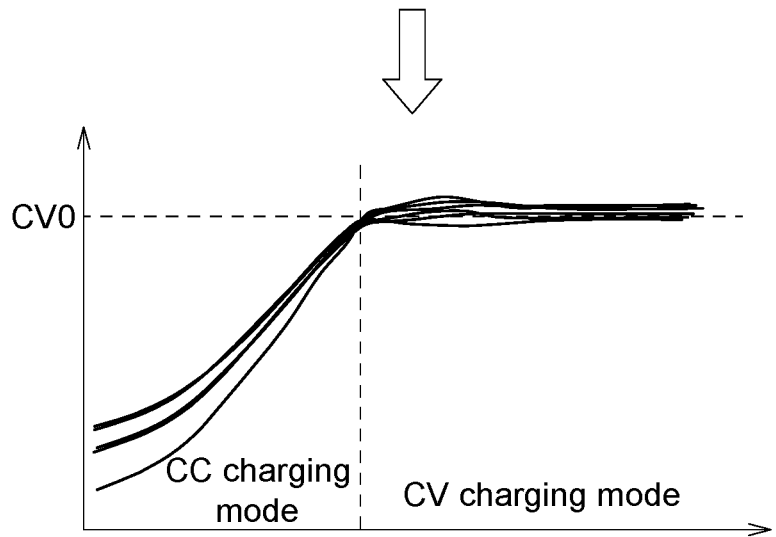

Please refer to FIG. 1B, which is a schematic diagram of a cell balance procedure according to an embodiment in which a plurality of cells is connected in series. Generally, the cells are charged by the constant current charging mode (CC charging mode). When the voltage of the cell reaches a predetermined voltage, it is switched from the constant current charging mode to the constant voltage charging mode (CV charging mode). This charging method is generally called CC-CV charging method. A single cell constant voltage charging set value CV0 is a charging voltage limitation when the cell is charging from the constant current charging mode to the constant voltage charging mode. For example, the single cell constant voltage charging set value CV0 of a cell with NCM material is between 4.1V to 4.2V. Similarly, for a battery system composed of a plurality of cells connected in series, the battery system constant voltage charging set value is generally a product of the single cell constant voltage charging set value CV0 and the number of the cells of the battery system. For example, if the single cell constant voltage charging set value CV0 is set to 4.1V and the number of series connected cells of the battery system is 100, then the battery system constant voltage charging set value will be set at 410V. As shown in upper diagram in FIG. 1B, in case of that the capacities of the cells are uneven due to the degradation, or the voltage difference among the cells is large, the voltages of the cells are scattered and are not converged at the single cell constant voltage charging set value CV0, when the voltage of the battery system reaches the battery system constant voltage charging set value.

As shown in lower diagram in FIG. 1B, in case of charging balance method, a balance charge capacity Qab (shown in FIG. 7A) is provided to the cell whose voltage is not highest during the cell balance procedure. In case of discharging balance method, the cell whose voltage is not lowest is discharged with the balance charge capacity Qab. In the charging balance method, the isolated charger provides the balance charge capacity to the cell whose voltage is not highest, such that the voltages of the cells can be closed to the highest voltage of the cells. In the discharging balance method, a resistor is used to consume the capacity of the cell whose voltage is not the lowest, such that the voltages of the cells can be closed to the lowest voltage of the cells. Therefore, when the battery system is charged to the battery system constant voltage charging set value, it is better that the voltage difference among the cells is low when each of the cells reaches the single cell constant voltage charging set value CV0. In other words, if the single cell constant voltage charging set values CV0 of the battery system are closed, when the battery system is charging at CV charging mode, the cells of battery system can avoid the risks of overcharged, thermal runaway and accelerating degradation, and the battery system can improve the effective capacity of the battery system.

Figure 2:
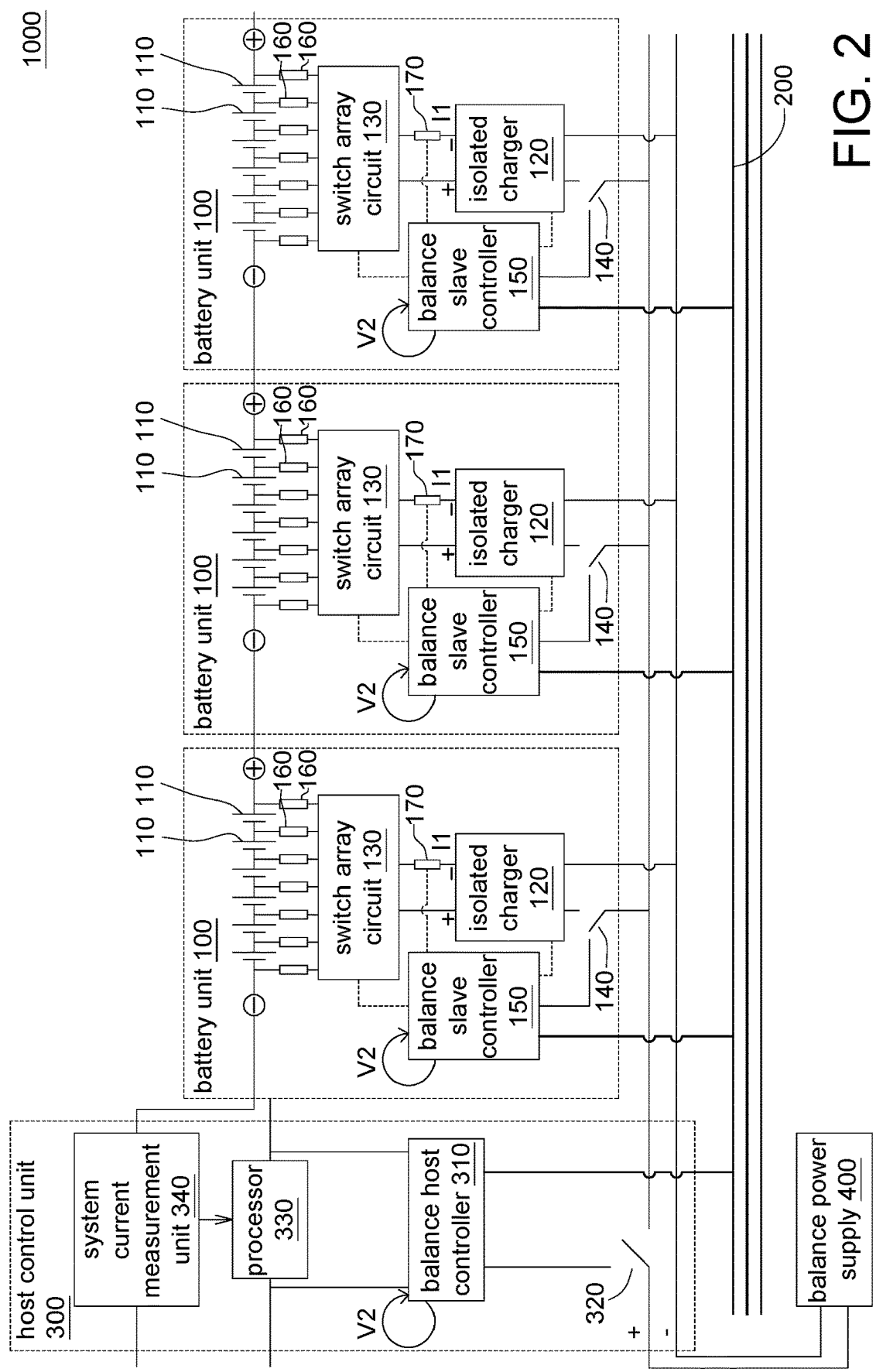
FIG. 2 is a schematic diagram of a battery system according to one embodiment.

Please refer to FIG. 2, which is a schematic diagram of a battery system 1000 according to one embodiment. The battery system 1000 includes a plurality of battery units 100, a communication bus 200, a host control unit 300 and a balance power supply 400. Each of the battery units 100 includes a plurality of cells 110, an isolated charger 120, a switch array circuit 130, a balance slave switch 140, a balance slave controller 150, a plurality of channel fuses 160 and a balance current measurement unit 170. The isolated charger 120, the switch array circuit 130, the balance slave switch 140, the balance slave controller 150, the channel fuse 160 and the balance current measurement unit 170 may be a circuit, a chip or a circuit board. The function of each of those elements is described as below.

The isolated charger 120 is configured to perform a cell balance procedure for the cell 110. The isolated charger 120 may provide the balance charge capacity Qab (shown in FIG. 7A) to one of the cells 110, and make all of the cells 110 trend to voltage balance.

The switch array circuit 130 is disposed between the cells 110 and the isolated charger 120. The switch array circuit 130 is used for connecting the positive electrode and the negative electrode of the isolated charger 120 to one of the cells 110. The detail structure of the switch array circuit 130 is illustrated via FIGS. 3A to 3B.

The balance slave switch 140 is connected between the isolated charger 120 and the balance power supply 400. The balance slave controller 150 is connected to the isolated charger 120, the switch array circuit 130 and the balance slave switch 140. The balance slave switch 140 is controlled by the balance slave controller 150. When the balance slave switch 140 is turned off to non-conducting state, the isolated charger 120 cannot perform the cell balance procedure.

The balance slave controller 150 is configured to calculate the balance detection voltage V2. The balance detection voltage V2 is used for calculating the balance charge capacity Qab (the detail calculation is described in FIGS. 4 to 6). The balance slave controller 150 is further configured to control the switch array circuit 130, such that the isolated charger 120 can supplement the capacity of one of the cells 110 for performing the cell balance procedure.

The channel fuses 160 are disposed between the cells 110 and the switch array circuit 130. When abnormality, such as short circuit, occurs at the switch array circuit 130, the channel fuse 160 will be melt and automatically cuts off the channel connected to the cell 110.

The balance current measurement unit 170 is connected between the isolated charger 120 and the switch array circuit 130. The balance current measurement unit 170 is used for measuring a balance current I1 of a channel of the cell 110, for assisting the balance slave controller 150 to calculate the balance charge capacity Qab of each of the cells 110, and controlling the switching operation of the balance power supply for each cell 110.

The communication bus 200 is connected to the balance slave controller 150 of the battery units 100 and the host control unit 300. The communication bus 200 is used for enabling bidirectional communication between the battery unit battery unit 100 and the host control unit 300 for cross protection.

The host control unit 300 includes a balance host controller 310, a balance host switch 320, a processor 330 and a system current measurement unit 340. The balance host controller 310, the balance host switch 320, the processor 330 and the system current measurement unit 340 may be a circuit, a chip or a circuit board. The detail of those elements is illustrated as below.

The system current measurement unit 340 is connected between the output and the negative electrode of the battery system 1000 in which the battery units 100 are connected in series, and configured to measure the system current passing through the battery units 100 of the battery system 1000. The product of the system current and time is the system capacity which is used for calculating the charging (or discharging) capacity of each of the cells 110 during the cell balance procedure. The balance host controller 310 is connected to the communication bus 200 and the balance host switch 320. The balance host controller 310 and the balance slave controller 150 interactively transfer battery information via the communication bus 200. The balance host controller 310 also calculates the balance detection voltage V2. It means that each of the balance slave controllers 150 and the balance host controller 310 calculate the balance detection voltage V2 at the same time. In general case, the balance detection voltage V2 calculated by the balance slave controller 150 and the balance detection voltage V2 calculated by the balance host controller 310 will be quite close.

The balance host switch 320 controls the balance power supply 400. In detail, the balance host switch 320 is connected between the balance power supply 400 and the balance slave switch 140, and the balance host switch 320 is controlled by the balance host controller 310. When the balance host switch 320 is turned off to non-conducting state, the cell balance procedure will be aborted.

In the event that the cutoff function of the balance host switch 320 fails, the cell balance procedure cannot be aborted, which may result in a risk that the cell 110 of the battery system 1000 is overcharging to thermal runaway. The battery system 1000 of this embodiment adopts decentralized computing, bidirectional communication between the host and the slave to implement the hardware and software cross-protection design to avoid the risks and the damages for overcharged cell when executing cell balance procedure.

In the present embodiment, when all the battery units 100 meet an activation condition (illustrated in FIGS. 9A to 10D), the balance host controller 310 turns on the balance host switch 320 to conducting state.

When a difference between the balance detection voltage V2 calculated by one of the balance slave controllers 150 and the balance detection voltage calculated by the balance host controller 310 is less than a predetermined value, the balance slave controller 150 turns on the corresponding balance slave switch 140 to conducting state. Only if the balance host switch 320 and the balance slave switch 140 are turned on to conducting state, the cell balance power can be supplied to the corresponding isolated charger 120 of the battery unit 100 to provide the balance current for the cell balance procedure. Besides, it is noted that the balance host controller 310 and the balance slave controllers 150 calculate the balance detection voltage V2 individually.

When the cell balance procedure is being performed and the balance host controller 310 detects data packet transferred delay (for example, none receive broadcast data packet at a period of time), the balance host controller 310 turns off the balance host switch 320 to non-conducting state, and keeps the battery system 1000 at a pause balance state until repaired. When one of the balance slave controllers 150 detects data packet transferred delay), the balance slave controller 150 turns off the corresponding balance slave switch 140 to non-conducting state, and keeps the battery system 1000 at the pause balance state until repaired. The pause balance state will be cancelled when the communication status is normal. When the data packet transformation returns to normal, the balance host controller 310 and the balance slave controllers 150 are returned to executing state, and the balance host switch 320 and the balance slave switch 140 are turned on to re-conducting state and continues the cell balance procedure.

The host control unit 300 and the battery unit 100 exchange information and perform the same calculations. When receiving the information and reply data packet from the battery units 100 and confirming that all the battery units 100 meet the activation condition, the host control unit 300 turns on the balance host switch 320 to conducting state, and send a start command of the cell balance procedure to the battery units 100.

When a difference between the balance detection voltage V2 calculated by the battery unit 100 and the balance detection voltage V2 calculated by the host control unit 300 is less than a predetermined value (that is, the calculated results of battery units 100 and the host control unit 300 are almost the same and it corresponds to the information of the balance host controller 310 and slave controllers 150 is synchronization), and the balance slave controllers 150 start up the cell balance procedure when received the stat command of the balance procedure from the host control unit 300.

The host control unit 300 checks the periodic broadcast information from the battery units 100, and each of the battery units 100 checks the periodic broadcast information from the host control unit 300. If any party finds that the periodic broadcast information is abnormal and reaches the timeout setting, it will trigger the pause command of cell balance procedure to turn off the corresponding switch to non-conducting state and suspend the balance power supply to the isolated charger 120. Therefore, when the balance host controller 310 fails and remains in conducting state, the balance slave controller 150 of the battery unit 100 still can pause the cell balance procedure. Conversely, when the balance slave controller 150 fails and remains in conducting state, the balance host controller 310 still can pause the cell balance procedure.

Based on the above characteristics, the host control unit 300 and the battery units 100 have the hardware and the software cross protection function.

The hardware cross protection function is established by the balance host switch 320 of the host control unit 300 and the balance slave switches 140 of the battery units 100. The balance host switch 320 is controlled by the balance host controller 310, and the balance slave switch 140 is controlled by the balance slave controller 150. Only if the host control unit 300 and the battery unit 100 respectively turn on the balance host switch 320 and the balance slave switch 140 to conducting state at the same time, the cell balance procedure is performed successfully. Therefore, there is a hardware cross protection function between the host control unit 300 and each battery unit 100 (software protection is required).

The detailed structure of the switch array circuit 130 is further described below. Please refer to FIG. 3A, which is a schematic diagram illustrating the detailed structure of the switch array circuit 130 according to an embodiment. Each of the switch array circuits 130 includes a plurality of connecting switches 131, two circuit buses 132, 133 and a plurality of polarity switches 134, 135, 136, 137. Two ends of each of the cells 110 are connected to two of the connecting switches 131 to form a channel. The circuit buses 132, 133 are connected to the connecting switches 131. The polarity switches 134, 135, 136, 137 are connected between the isolated charger 120 and the circuit buses 132, 133, such that two ends of the cell 110 which is performed the cell balance procedure and the isolated charger 120 have corresponding polarity. For example, when the first cell 110 from the left is needed to be performed the cell balance procedure, the first and second connecting switches 131 from the left can be turned on to conducting state. At this time, the circuit bus 132 is negatively charged, the circuit bus 133 is positively charged. The circuit bus 132 is connected to the negative electrode of isolated charger 120 through the polarity switch 135 which is turned on to conducting state, and the circuit bus 133 is connected to the positive electrode of isolated charger 120 through the polarity switch 136 which is turned on to conducting state, such that the negative electrode of the first cell 110 from the left is connected to the negative electrode of the isolated charger 120. And so on, when the second cell 110 from the left is needed to be performed the cell balance procedure, the second and third connecting switches 131 from the left and the polarity switches 134, 137 are turned on to conducting state, such that the positive electrode of the second cell 110 from the left is connected to the positive electrode of the isolated charger 120, and the negative electrode of the second cell 110 from the left is connected to the negative electrode of the isolated charger 120.

Figure 3A:
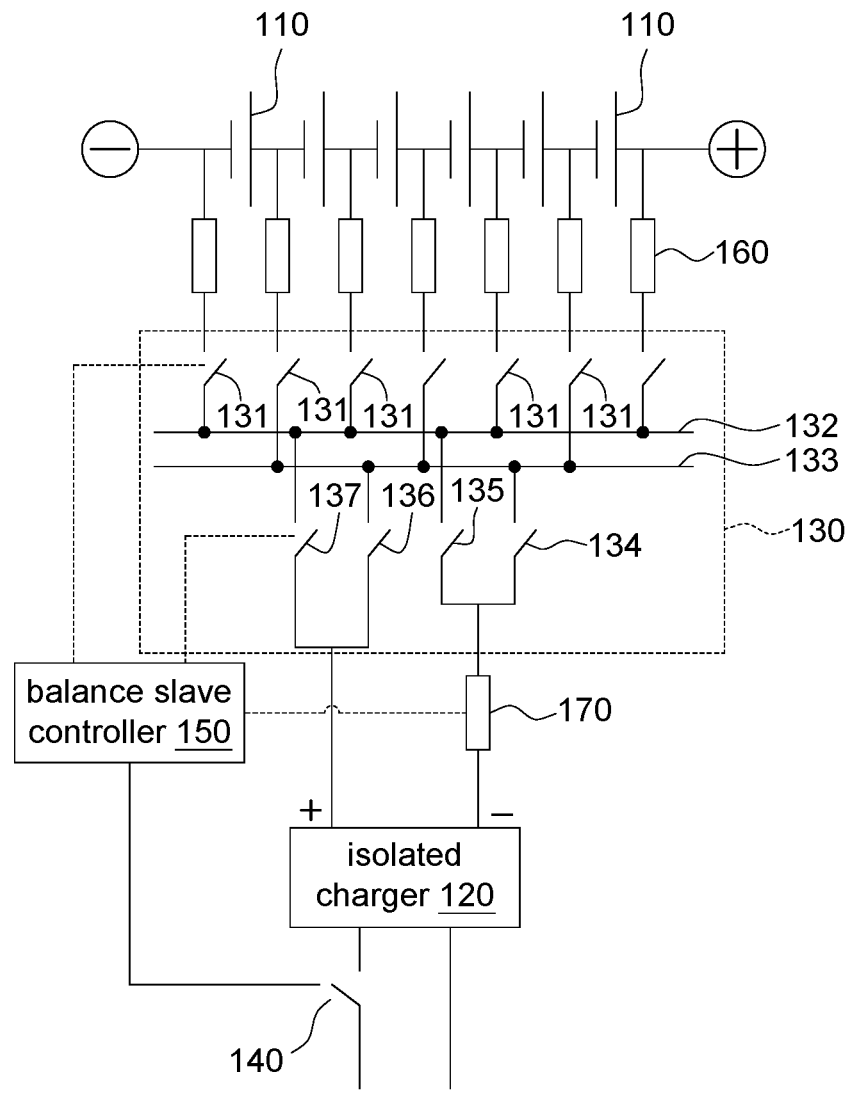
FIG. 3A is a schematic diagram illustrating the detailed structure of the switch array circuit according to an embodiment.
Figure 3B:
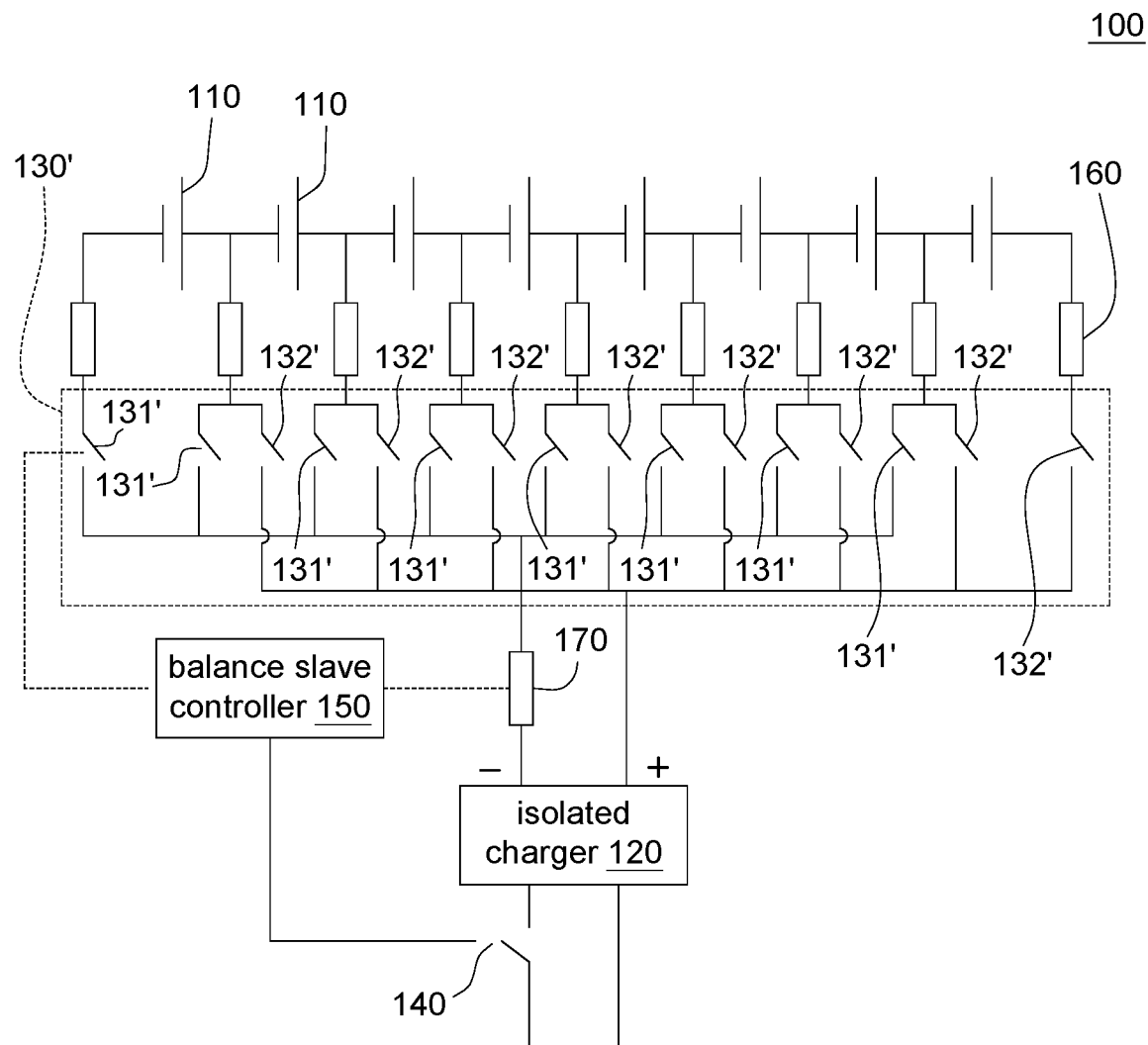
FIG. 3B is a schematic diagram illustrating the detailed structure of the switch array circuit according to another embodiment.

Please refer to FIG. 3B, which is a schematic diagram illustrating the detailed structure of the switch array circuit 130' according to another embodiment. Each of the switch array circuits 130' includes a plurality of connecting switches 131' and a plurality of connecting switches 132'. The connecting switches 131' are connected to the negative electrodes of the cells 110 and the negative electrode of the isolated charger 120, and the connecting switches 132' are connected to the positive electrodes of the cells 110 and the positive electrode of the isolated charger 120. The two ends of each of the cells 110 are connected to one of the connecting switches 131' and one of the connecting switches 132' to form a channel. For example, when the first cell 110 from the left is needed to be performed the cell balance procedure, the connecting switch 131' from the left and the connecting switch 132' from the left are turned on to conducting state, such that the positive electrode of the first cell 110 from the left is connected to the positive electrode of the isolated charger 120, and the negative electrode of the first cell 110 from the left is connected to the negative electrode of the isolated charger 120. And so on, when the second cell 110 from the left is needed to be performed the cell balance procedure, the connecting switch 131' from the left and the connecting switch 132' from the left are turned on to conducting state, such that the positive electrode of the second cell 110 from the left is connected to the positive electrode of the isolated charger 120, and the negative electrode of the second cell 110 from the left is connected to the negative electrode of the isolated charger 120.

In addition, as shown in FIGS. 3A and 3B, the channel fuses 160 are used in the present embodiment to improve the safety. As shown in FIG. 3A, the channel fuses 160 are connected to the connecting switches 131, and each of the channel fuses 160 will be melt to cut off the balance current channel when the corresponding connecting switch 131 is abnormal (such as any switch array circuit 130 or connecting switch 131 is failed and keeps on conducting state which cannot be disconnected). As shown in FIG. 3B, the channel fuses 160 are connected to the connecting switches 131', 132', and each of the channel fuses 160 will be melt to cut off the balance current channel when the corresponding connecting switches 131', 132' are abnormal (for example, any connecting switch 131' and 132' is failed and keeps on conducting state which cannot be disconnected). Each of the balance slave controller 150 can confirm whether the channel fuses 160 are melt according to the balance current I1.

Furthermore, as shown in FIGS. 3A and 3B, the balance current measurement unit 170 is used in the present embodiment to improve the accuracy of the cell balance procedure. As shown in FIGS. 3A and 3B, the balance current measurement unit 170 is connected between the isolated charger 120 and the switch array circuit 130. The balance current measurement unit 170 is used for measuring the balance current I1 of each of the channels to obtain the balance current of each of the cells 110. With the built-in timer function of the balance slave controller 150, the balance charge capacity is defined as the product of the balance current of the cell 110 and the time, so the balance charge capacity (or discharge capacity) of each of the cells 110 can be accurately calculated. Taking charge balance as an example, the isolated charger 120 supply the balance current to one after another for the cell 110 of battery unit 100 until the cell 110 reaches the balance charge capacity Qab. The balance charging sequence is from the cell with the lowest voltage to the cell with the highest voltage.

The balance charge capacity Qab is a capacity supplemented to one of the cells which has lower voltage in the cell balance procedure, such that the voltages of the cells 110 of the battery system 1000 are balanced. The following explains the calculation method of the balance charge capacity Qab. In this embodiment, if the battery system 1000 is charging and the corresponding condition is met, the balance slave controller 150 or the balance host controller 310 calculates the balance charge capacity Qab through the system current measurement unit 340. Please refer to FIG. 4, which is a schematic diagram of the balance charge capacity Qab. As shown in the upper diagram in FIG. 4, the battery system 1000 with two cells 110 connected in series is shown. Suppose that in the battery system 1000, A cell 110 has the highest voltage and the voltage curve thereof is the curve B1 in FIG. 4; B cell 110 has lower voltage and the voltage curve thereof is the curve B2 in FIG. 4. When the voltage of the A cell 110 in the battery system 1000 rises to the balance detection voltage V2, the battery system 1000 records the charging capacity through the system current measurement unit 340 as the first capacity Qa. As the charging capacity continues to increase, when the voltage of the B cell 110 rises to the balance detection voltage V2, the second capacity Qb is recorded.

The capacity difference between the second capacity Qb and the first capacity Qa is the balance charge capacity Qab that the B cell 110 needs to charge in the cell balance procedure.

Figure 4:
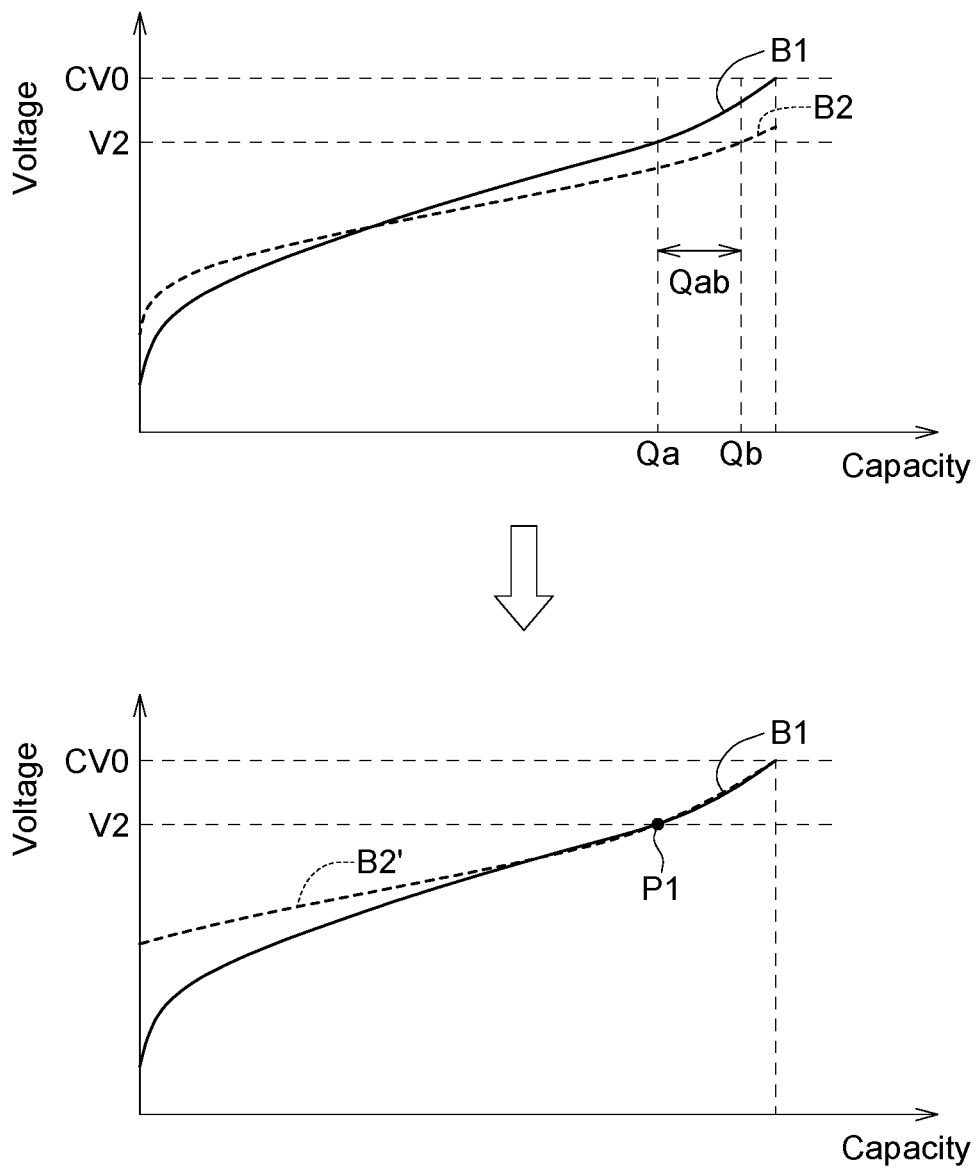
FIG. 4 is a schematic diagram of the balance charge capacity.

As shown in the lower diagram of FIG. 4, after the balance charge capacity Qab is charged to the B cell 110 through the isolated charger 120, the voltage curve B2 of the B cell 110 is shifted to the left to become a voltage curve B2', and the voltage curve B2 and the voltage curve B1 are coincided at the point P1. It means that the voltage of the A cell 110 and the B cell 110 is overlap at the balance detection voltage V2. After the charging continues, the voltage of A cell 110 and the B cell 110 continue to rise with a very small difference, and each cell 110 of battery system 1000 reach the constant voltage charging set value CV0 almost simultaneously.

The above description uses a simplest battery system with two cells to illustrate how to use balance detection voltage V2 to calculate the balance charge capacity Qab. When the number of the cells 110 exceeds two, the method is the same as that of two cells 110. It should be noted that as long as the cell 110 whose voltage is not the highest of the battery system 1000, the balance charge capacity Qab can be calculated, and it corresponds to the capacity difference relative to the cell 110 with the highest voltage. For example, if the battery system 1000 has 100 cells 110 connected in series, 99 balance charge capacities Qab can be calculated. If the voltage difference of these cells 110 is small, the balance charge capacity Qab should be small and turns off the balance charge procedure. Therefore, the cell balance procedure only is executed when the voltage difference of battery system 1000 exceed the predetermined value.

However, the balance detection voltage V2 cannot be set too high, nor can it be set too low. The reasons will be explained in detail below through FIGS. 5A to 5C.

Figure 5A:
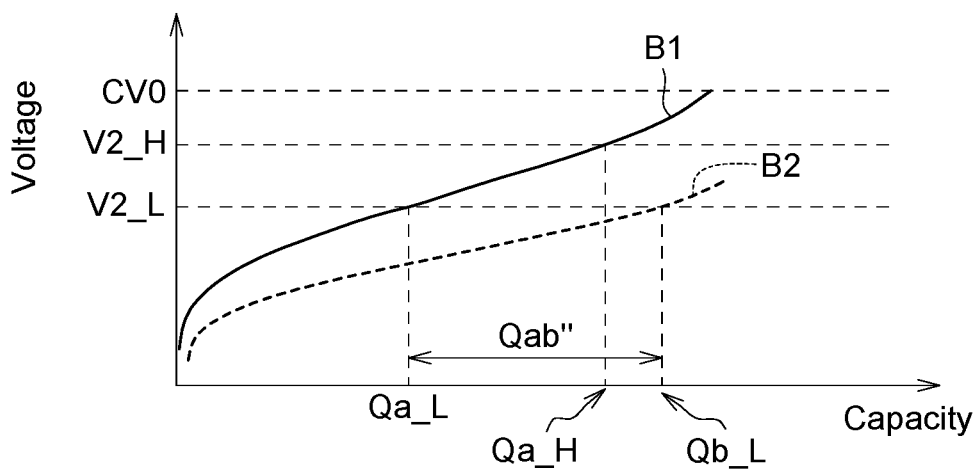
FIG. 5A is a schematic diagram of a lower balance detection voltage and a higher balance detection voltage.
Figure 5B:
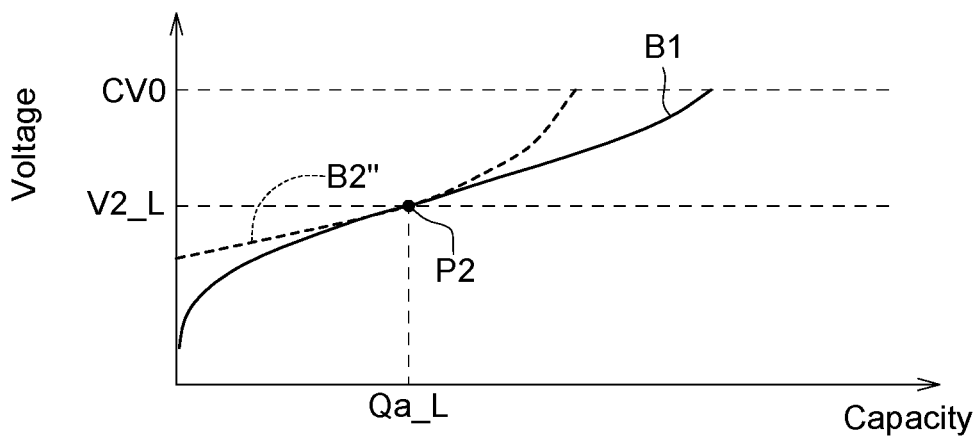
FIG. 5B is a schematic diagram illustrating the cell balance procedure performed on the cell with the lowest voltage according to the lower balance detection voltage.

Please refer to FIG. 5A, which is a schematic diagram of a lower balance detection voltage V2_L and a higher balance detection voltage V2_H. When the voltage curve B1 rises to the balance detection voltage V2_L, the battery system 1000 records the charging capacity as the first capacity Qa_L; when the voltage curve B1 rises to the balance detection voltage V2_H, the battery system 1000 records the charging capacity as the first capacity Qa_H; when the voltage curve B2 rises to the balance detection voltage V2_L, the battery system 1000 records the charging capacity as the first capacity Qb_L. The difference between the lower balance detection voltage V2_L and the single cell constant voltage charging set value CV0 is large, and the difference between the higher balance detection voltage V2_H and the single cell constant voltage charging set value CV0 is small. Refer to FIG. 5B, which is a schematic diagram illustrating the cell balance procedure performed on the cell 110 with the lowest voltage according to the lower balance detection voltage V2_L. The difference between the lower balance detection voltage V2_L and the single cell constant voltage charging set value CV0 is too large, so the curve B2 of the cell 110 with the lowest voltage, is converted into the curve B2" after being supplemented by the balance charge capacity Qab". Although the highest and the lowest voltage of the cells 110 are overlapping at the point P2, the voltage of the voltage curves B1 and B2 will diverge again when the cells keep charging to the single cell constant voltage charging set value CV0 because the differences in impedance, capacity, temperature of cell status. Therefore, it cannot reach the balance goal that all cells 110 of battery system 1000 reach the single cell constant voltage charging set value CV0 at the same time when charging.

Figure 5C:
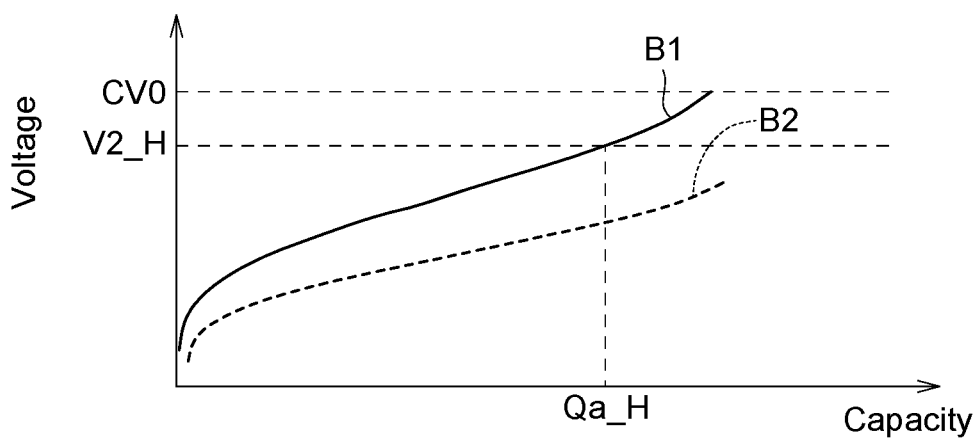
FIG. 5C is a schematic diagram illustrating the cell balance procedure performed on the cell with the lowest voltage according to the higher balance detection voltage.

Please refer to FIG. 5C, which is a schematic diagram illustrating the cell balance procedure refers to the higher balance detection voltage V2_H. The cell 110 with the highest voltage reaches the balance detection voltage V2_H to obtain the first capacity Qa_H, but the charging current begins to decrease due to the battery system 1000 entering the constant voltage charging mode. It will cause the cell 110 with the lowest voltage cannot reach the balance detection voltage V2_H to get the first capacity Qb_H (not shown in FIG. 5C). Therefore, it is resulting in the inability to complete the calculation of the balance charge capacity Qab (not shown in FIG. 5A), and the entire cell balance procedure can never be started.

Figure 6:
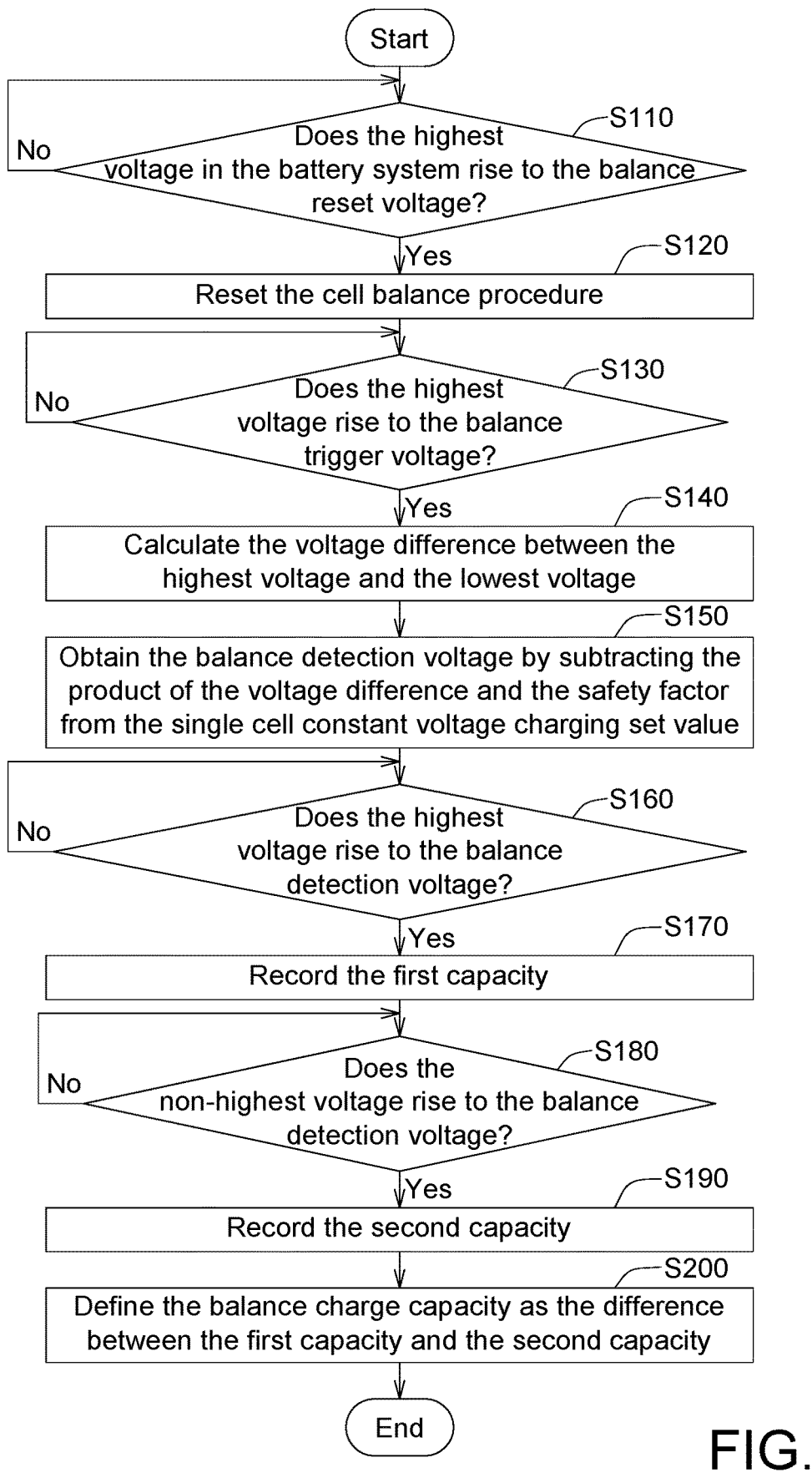
FIG. 6 is a flowchart of a calculation method of the balance charge capacity according to an embodiment
Figure 7A:
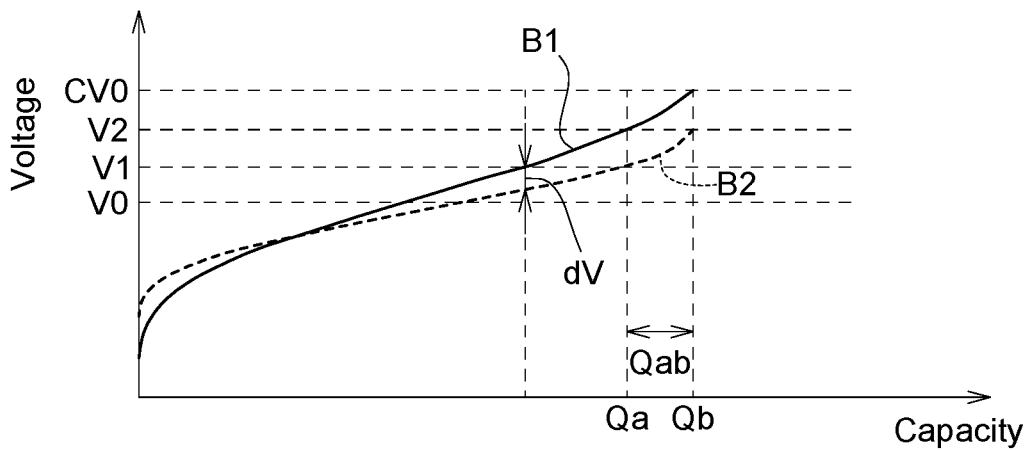
FIG. 7A is a schematic diagram of a first calculation of the balance charge capacity.
Figure 7B:
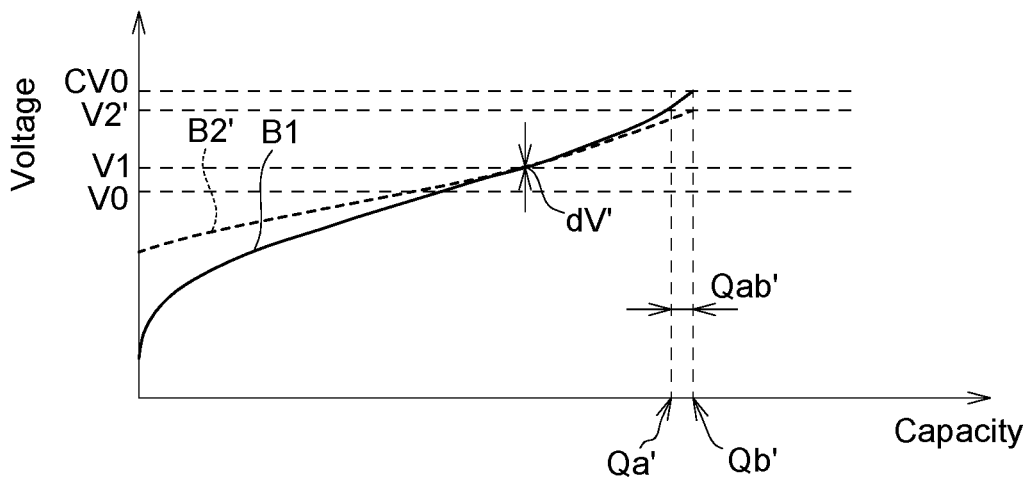
FIG. 7B is a schematic diagram of a second calculation of the balance charge capacity.

In order to avoid setting the balance detection voltage V2 too low or too high, the present embodiment proposes an auto setting strategy for the balance detection voltage V2, and takes the battery system with two cells as an example for description. Please refer to FIG. 6 and FIGS. 7A to 7B. FIG. 6 is a flowchart of a calculation method of the balance charge capacity Qab according to an embodiment, FIG. 7A is a schematic diagram of a first calculation of the balance charge capacity Qab, and FIG. 7B is a schematic diagram of a second calculation of the balance charge capacity Qab. First, please refer to FIG. 6 and FIG. 7A for the first calculation of the balance charge capacity Qab. Assume that the cell 110 with the highest voltage in the battery system 1000 has the curve B1 in FIG. 7A; the cell 110 with the lowest voltage has the curve B2 in FIG. 7A.

The calculation method of the balance charge capacity Qab is as follows: If the cell 110 with the highest voltage rises to a balance reset voltage V0, the register data of the cell balance procedure is reset (as steps S110, S120). If the cell 110 with the highest voltage rises to a balance trigger voltage V1, a voltage difference dV between the highest voltage and the lowest voltage is calculated (as in steps S130, S140). The balance detection voltage V2 is obtained by subtracting the product of the voltage difference dV and a safety factor from the single cell constant voltage charging set value CV0. The single cell constant voltage charging set value CV0 is the charging voltage limitation when the cell is charging from the constant current charging mode to the constant voltage charging mode (as in steps S150). If the highest voltage rises to the balance detection voltage V2, then the system capacity of the battery system 1000 is recorded as the first capacity Qa (as steps S160, S170). If any voltage of the cells rises to the balance detection voltage V2, then the system capacity of the battery system 1000 is recorded as the second capacity Qb (such as steps S180, S190). The balance charge capacity Qab is defined as the difference between the first capacity Qa and the second capacity Qb (as in step S200).

In detail, in step S110, whether the highest voltage in the battery system 1000 rises to the balance reset voltage V0 is determined. If the highest voltage rises to the balance reset voltage V0, then the process proceeds to the step S120. In one embodiment, the balance reset voltage V0 is 3900 mV for NMC cathode material of a lithium-ion cell.

In step S120, the cell balance procedure is reset. The so-called reset means that regardless of whether the cell balance procedure is completed, the cell balance procedure is stopped, and all values of the relevant temporary registers are set to the initial state.

In step S130, whether the highest voltage rises to the balance trigger voltage V1 is determined. If the highest voltage rises to the balance trigger voltage V1, then the process proceeds to the step S140. The balance trigger voltage V1 is higher than the balance reset voltage V0.

In step S140, the voltage difference dV between the highest voltage and the lowest voltage is calculated. The balance trigger voltage V1 is 4000 mV, for example. At this time, the lowest voltage in battery system 1000 is 3930 mV, so when the balance trigger voltage V1 is reached, the voltage difference dV between the highest voltage and the lowest voltage is 70 mV. As shown in FIG. 7A, the voltage difference dV is 70 mV, for example.

In step S150, the balance detection voltage V2 is obtained by subtracting the product of the voltage difference dV and the safety factor from the single cell constant voltage charging set value CV0 (i.e. the balance detection voltage V2=the single cell constant voltage charging set value CV0−the voltage difference dV*the safety factor f). In one embodiment, the single cell constant voltage charging set value CV0 is 4150 mV, the safety factor f is 1.5. The balance detection voltage V2 is 4045 mV (4150 mV−(70 mV*1.5)=4045 mV).

In step S160, whether the highest voltage rises to the balance detection voltage V2 is determined. If the highest voltage rises to the balance detection voltage V2, then the process proceeds to the step S170. The balance detection voltage V2 is higher than the balance trigger voltage V1.

In step S170, the first capacity Qa is recorded. In detail, the capacity when the highest voltage rises to the balance detection voltage V2 is recorded as the first capacity Qa.

In step S180, whether the non-highest voltage rises to the balance detection voltage V2 is determined. If the non-highest voltage rises to the balance detection voltage V2, then the process proceeds to the step S190.

In step S190, the second capacity Qb is recorded. In detail, the capacity when the non-highest voltage rises to balance detection voltage V2 is recorded as the second capacity Qb.

In step S200, the balance charge capacity Qab is defined as the difference between the first capacity Qa and the second capacity Qb (the balance charge capacity Qab=the second capacity Qb−the first capacity Qa).

Through the above procedure, a first calculation of the balance charge capacity Qab can be completed. Next, please refer to FIG. 6 and FIG. 7B for the second calculation of the balance charge capacity Qab. In step S110, whether the highest voltage in battery system 1000 rises to the balance reset voltage V0 (for example, 3900 mV) is determined. If the highest voltage rises to the balance reset voltage V0, then the process proceeds to the step S120.

In S120, the cell balance procedure is reset.

In step S130, whether the highest voltage rises to the balance trigger voltage V1 (e.g. 4000 mV) is determined. If the highest voltage rises to the balance trigger voltage V1, then the process proceeds to the step S140.

In step S140, the voltage difference dV' of the highest voltage and the lowest voltage is calculated. As shown in FIG. 7B, the cell 110 with the lowest capacity has been charged with the balance charge capacity Qab, and its corresponding curve B2 has been shifted to the curve B2'. Therefore, in theory, when the highest voltage reaches the balance trigger voltage V1, the voltage difference between the lowest voltage of the cell 110 at this time should be smaller than the previous time. In one embodiment, when the balance trigger voltage V1 is reached at this time, the voltage difference dV' of the highest voltage and the lowest voltage is reduced to 15 mV.

In step S150, the balance detection voltage V2' is obtained by subtracting the product of the voltage difference dV' and the safety factor from the single cell constant voltage charging set value CV0 (i.e. the balance detection voltage V2=the single cell constant voltage charging set value CV0−the voltage difference dV'*safety factor f). In one embodiment, the single cell constant voltage charging set value CV0 is fixed at 4150 mV, and the safety factor is fixed at 1.5. The balance detection voltage V2' is 4127.5 mV (4150 mV−(15 mV*1.5)=4127.5 mV).

In step S160, whether the highest voltage rises to the balance detection voltage V2' is determined. If the curve B1 of the highest voltage rises to the balance detection voltage V2', then the process proceeds to the step S170.

In step S170, the first capacity Qa' is recorded. In detail, the charging capacity when the highest voltage rises to the balance detection voltage V2' is recorded as the first capacity Qa'.

In step S180, whether the non-highest voltage rises to the balance detection voltage V2' is determined. If the non-highest voltage (lowest voltage in this embodiment) rises to the balance detection voltage V2', then the process proceeds to the step S190.

In step S190, the second capacity Qb' is recorded. In detail, the charging capacity when the non-highest voltage (lowest voltage in this embodiment) rises to the balance detection voltage V2' is recorded as the second capacity Qb'.

In step S200, the balance charge capacity Qab' is defined as the difference between the first capacity Qa' and the second capacity Qb' (i.e. the balance charge capacity Qab'=the second capacity Qb'−the first capacity Qa').

From FIGS. 7A and 7B, as the number of executions of the cell balance procedure increases, the balance detection voltage V2' will gradually approach the single cell constant voltage charging set value CV0, and the voltage difference dV' will gradually shrink, the balance charge capacity Qab' will gradually decrease. In this way, the balance detection voltage V2 with an auto-tuning design can ensure that whether the voltage difference is large or small, the cell balance procedure can be correctly executed, and gradually converges to the expected voltage of the single cell constant voltage charging set value CV0.

Figure 8:
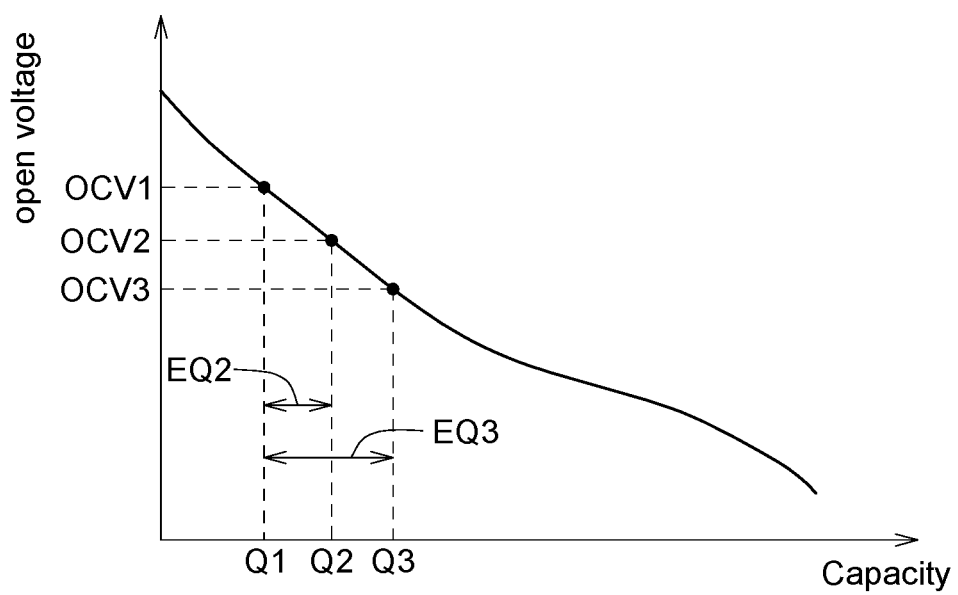
FIG. 8 is an open circuit voltage curve according to one embodiment.

In addition to the above algorithm, the open circuit voltage (OCV) can also be used to calculate the balance charge capacity. Please referring to FIG. 8, according to the relationship between the OCV of the cell and the capacity, different OCVs correspond to different capacities. When the balance slave controller 150 and the balance host controller 310 are not activated, it is assumed that the battery system is connected in series by three cells, and the first cell has an open circuit voltage OCV1, and so on. The open circuit voltages OCV1, OCV2 and OCV3 are mapping to the corresponding cell capacity Q1, Q2 and Q3, which can be directly found form FIG. 8. The capacity difference EQ2 corresponds to the balance charge capacity if the open circuit voltage OCV2 is closed to the open circuit voltage OCV1. The capacity difference EQ3 is the balance charge capacity if the open circuit voltage OCV3 is closed to the open circuit voltage OCV1. The method of FIG. 8 can be performed when the battery system is at a steady state without charging or discharging.

Figure 9A:
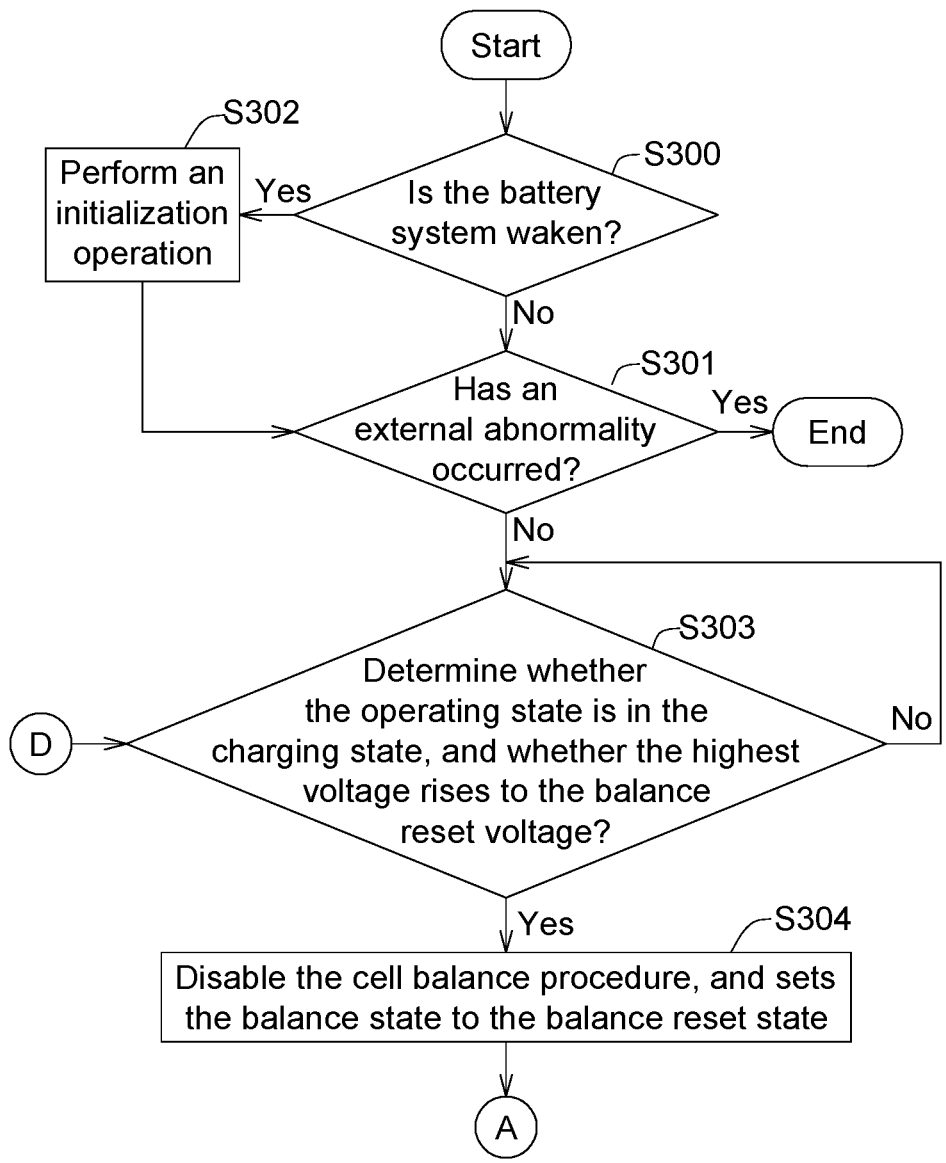
FIGS. 9A to 9D are flow charts of the control method of the cell balance procedure of the host control unit according to an embodiment.

Next, the control method of the cell balance procedure of the battery system 1000 of this embodiment will be described in more detail. Please refer to FIGS. 9A to 9D, which are flow charts of the control method of the cell balance procedure of the host control unit 300 according to an embodiment. As shown in FIG. 9A, in step S300, the balance host controller 310 determines whether the battery system 1000 is woken up. If the battery system 1000 is woken up, then the process proceeds to step S302; if the battery system 1000 is not woken up, then the process proceeds to step S301.

As shown in FIG. 9A, in step S301, the balance host controller 310 determines whether an external abnormality that the cell balance procedure must be forcibly suspended has occurred. If an external abnormality occurs, then this process is terminated; if no external abnormality occurs, the process proceeds to step S303.

As shown in FIG. 9A, in step S302, the balance host controller 310 performs an initialization operation, sets the balance state to the off state, and clears the relevant register operation information in the balance host controller 310.

As shown in FIG. 9A, in step S303, the balance host controller 310 determines whether the operating state is in the charging state, and determines whether the highest voltage rises to the balance reset voltage V0. If the operating state is in the charging state and the highest voltage rises to the balance reset voltage V0, then the process proceeds to step S304. The battery system 1000 can identify the charging status because the balance host controller 310 can sense the charge and discharge current value of the battery system 1000.

As shown in FIG. 9A, in step S304, the balance host controller 310 disables the cell balance procedure, and sets the balance state to the balance reset state. The balance reset state includes clearing all values of the balance calculation and execution registers, the purpose is to recalculate the balance parameters according to this charging state.

Figure 9B:
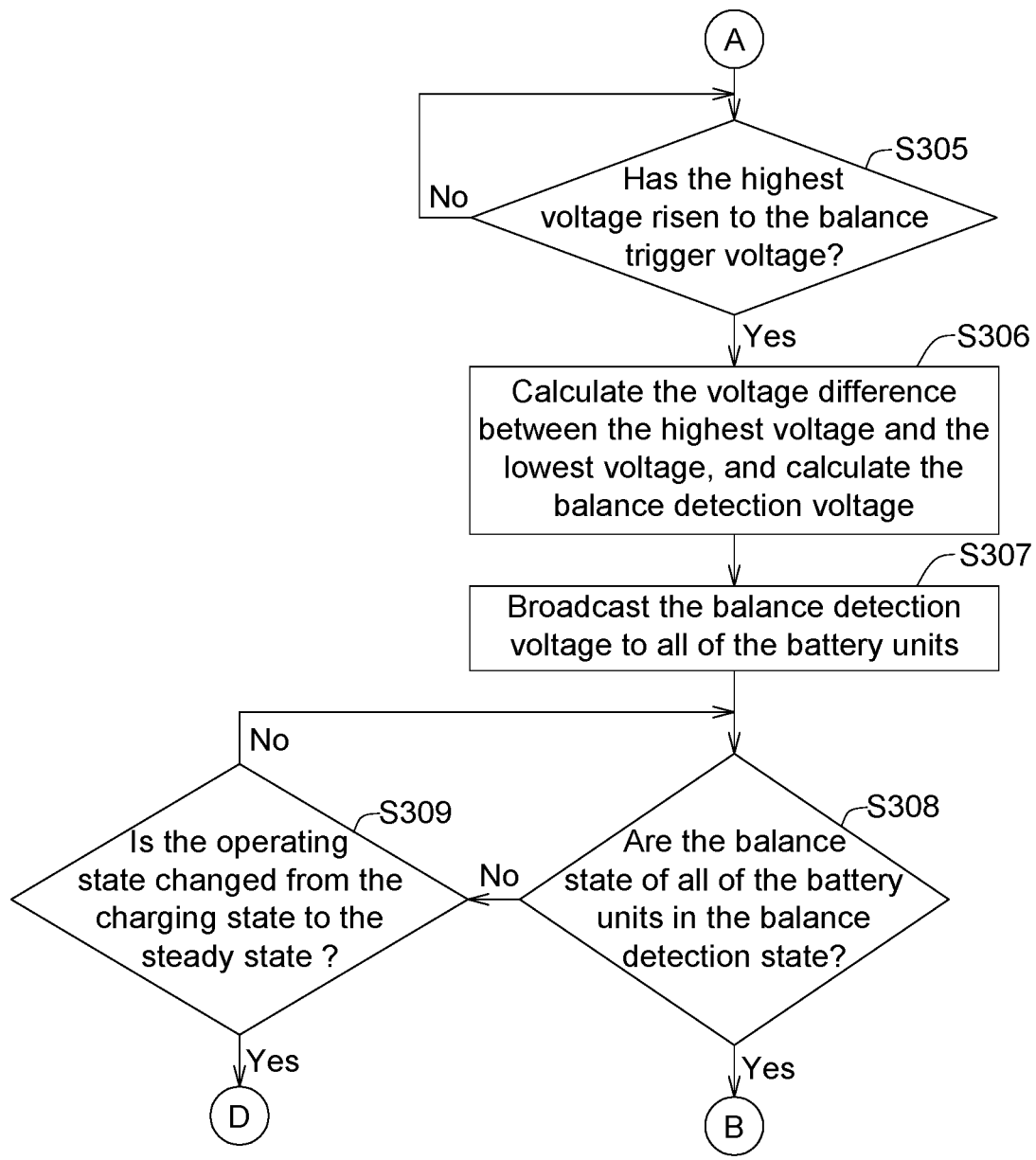

As shown in FIG. 9B, in step S305, the balance host controller 310 determines whether the highest voltage has risen to the balance trigger voltage V1. If the highest voltage rises to the balance trigger voltage V1, then the process proceeds to step S306; if the highest voltage does not rise to the balance trigger voltage V1, then the returns to step S305.

As shown in FIG. 9B, in step S306, the balance host controller 310 calculates the voltage difference dV between the highest voltage and the lowest voltage, and calculates the balance detection voltage V2.

As shown in FIG. 9B, in step S307, the balance host controller 310 broadcasts the balance detection voltage V2 to all of the battery units 100.

As shown in FIG. 9B, in step S308, the balance host controller 310 determines whether the balance state of all of the battery units 100 is in the balance detection state. Balance detection status refers to the process of calculating the balance charge capacity Qab. If the balance state of all battery units 100 is in the balance detection state, the process proceeds to step S310 of FIG. 9C; if the balance state of one of the battery unit 100 is not in the balance detection state, the process proceeds to step S309.

As shown in FIG. 9B, in step S309, the balance host controller 310 determines whether the operating state is changed from the charging state to the steady state. If the operating state is changed from the charging state to the steady state, then the process proceeds to step S303 of FIG.

9A; if the operating state is not changed from the charging state to the steady state, then the process returns to step S308.

Figure 9C:
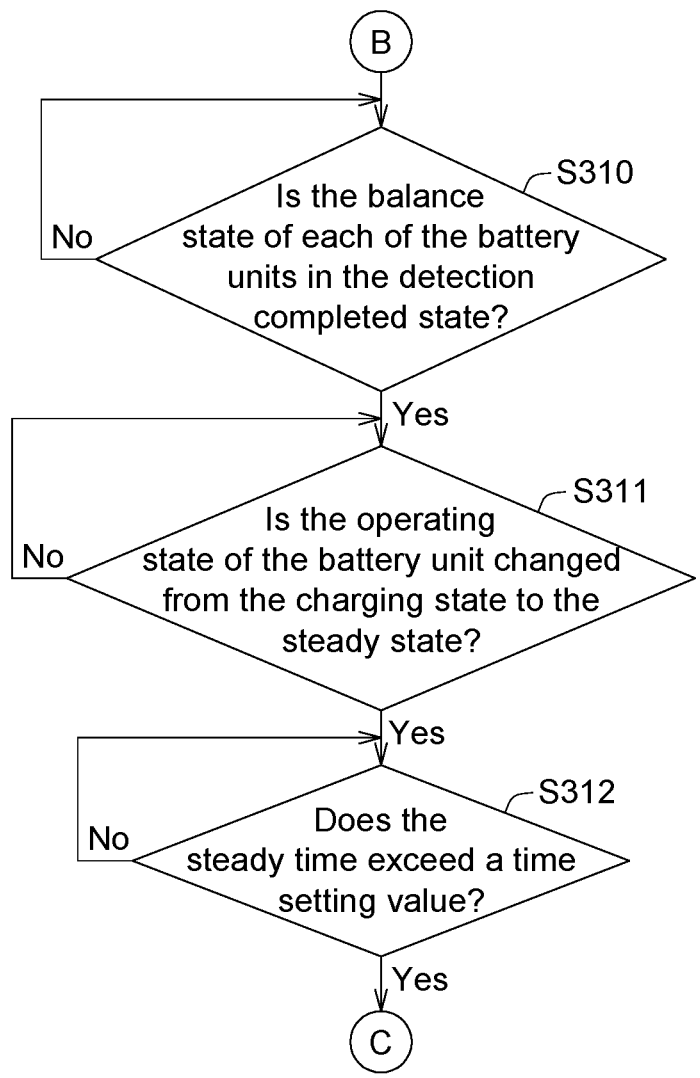

As shown in FIG. 9C, in step S310, the balance host controller 310 determines whether the balance state of each of the battery units 100 is in the detection completed state. If the balance state of each of the battery units 100 is the detection completed state, then the process proceeds to step S311; if the balance state of one of the battery units 100 is not the detection completed state, then the process returns to step S310.

As shown in FIG. 9C, in step S311, the balance host controller 310 determines whether the operating state of the battery unit 100 is changed from the charging state to the steady state. If the operating state of all battery units 100 is changed to the steady state, then the process proceeds to step S312; if the operating state of one of the battery units 100 is not changed to the steady state, then the process returns to step S311.

As shown in FIG. 9C, in step S312, the balance host controller 310 determines whether the steady time exceeds a time setting value. If the steady time exceeds the time setting value, the process proceeds to step S313 of FIG. 9D. If the steady time does not exceed the time setting value, then the process returns to step S312.

Figure 9D:
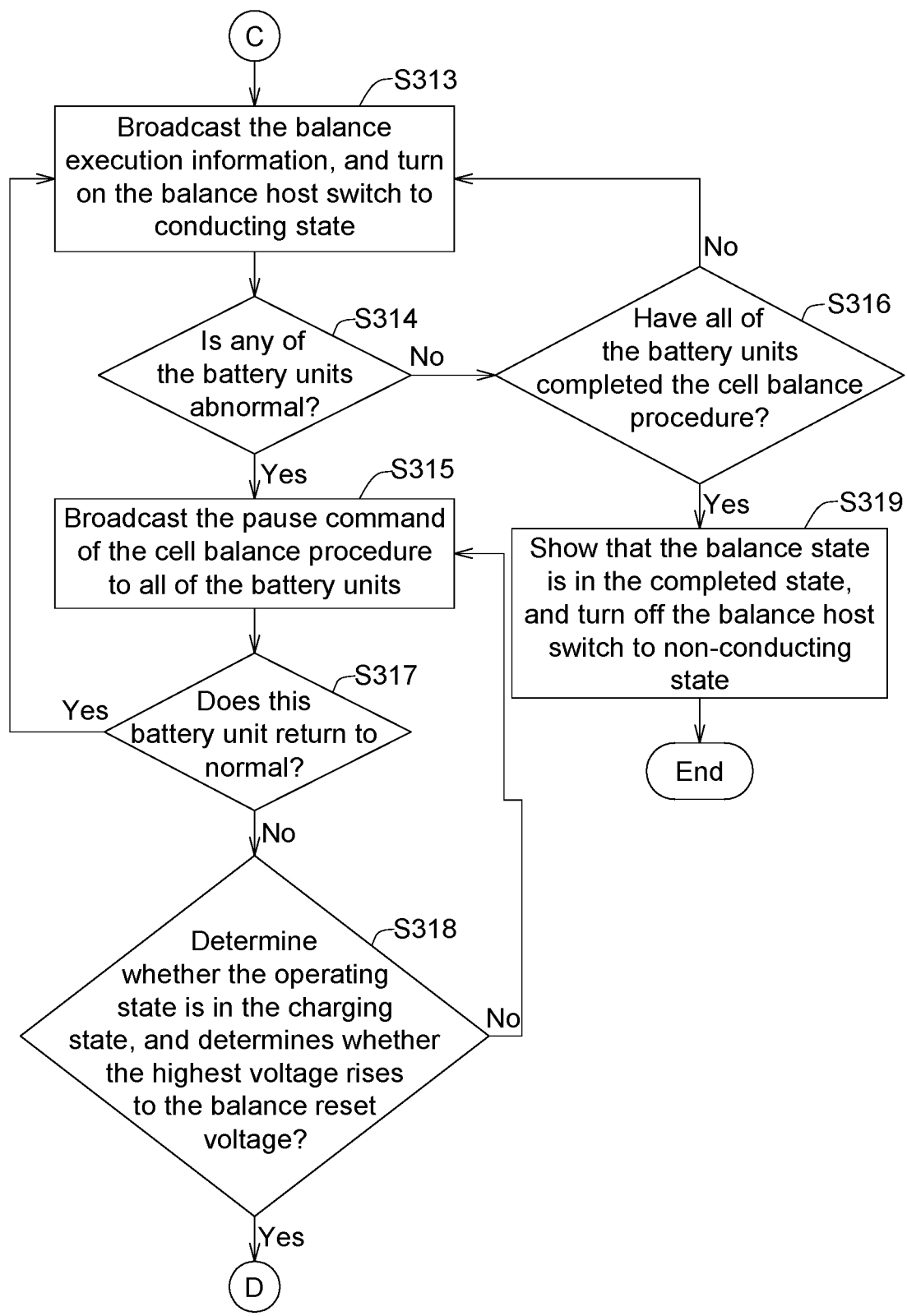

As shown in FIG. 9D, in step S313, the balance host controller 310 broadcasts the balance execution information, and turns on the balance host switch 320 to conducting state.

As shown in FIG. 9D, in step S314, the balance host controller 310 determines whether any of the battery units 100 is abnormal. If any one of the battery units 100 connected in series is abnormal, then the process proceeds to step S315; if the battery units 100 are not abnormal, then the process proceeds to step S316.

As shown in FIG. 9D, in step S315, the balance host controller 310 broadcasts the pause command of the cell balance procedure to all of the battery units 100. At this time, all relevant data in the balance slave controller 150 will not be cleared.

As shown in FIG. 9D, in step S317, the balance host controller 310 determines whether this battery unit 100 returns to normal. If this battery unit 100 returns to normal, then the process goes back to step S313; if this battery unit 100 does not return to normal, then the process goes to step S318.

As shown in FIG. 9D, in step S318, the balance host controller 310 determines whether the operating state is in the charging state, and determines whether the highest voltage rises to the balance reset voltage V0. If the operating state is in the charging state, and the highest voltage rises to balance reset voltage V0, then the process returns to step S303 in FIG. 9A; if the operating state is not in the charging state, or the highest voltage does not rise to balance reset voltage V0, then the process returns to the step S315.

As shown in FIG. 9D, in step S316, the balance host controller 310 determines whether all of the battery units 100 have completed the cell balance procedure. If all of the battery units 100 have completed the cell balance procedure, then the process proceeds to step S319; if not all of the battery units 100 have completed the cell balance procedure, then the process returns to step S313.

In step S319, the balance host controller 310 shows that the balance state is in the completed state, and the balance host switch 320 is turned off to non-conducting state.

From the control method of the host control unit 300, the host control unit 300 receives the data and status from each of the battery units 100. When the status of each of the battery units 100 meets the activation conditions, the balance host switch 320 is turned on to conducting state and the start command of the cell balance procedure is sent to each of the battery units 100.

The host control unit 300 will check the periodic broadcast information of each of the battery units 100. When the host control unit 300 finds that the broadcast information is abnormal or the data package transmission reaches the timeout setting, it will trigger a pause command of the cell balance procedure to cut off the balance host switch 320 to non-conducting state and stop the cell balance procedure.

Figure 10A:
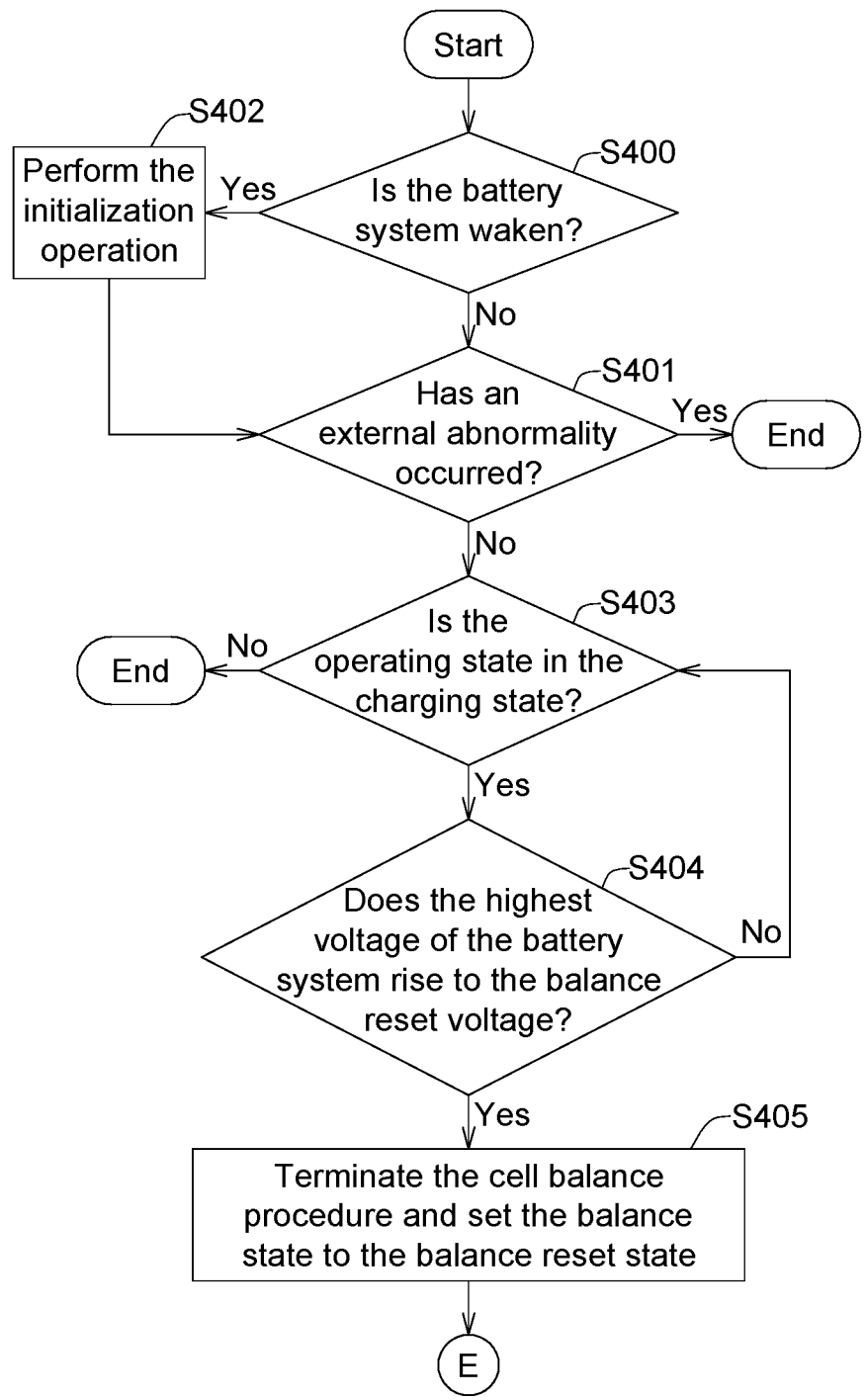
FIGS. 10A to 10D are flowcharts of a control method of the cell balance procedure of the battery unit according to an embodiment.

Please refer to FIGS. 10A to 10D, which are flowcharts of a control method of the cell balance procedure of the battery unit 100 according to an embodiment. As shown in FIG. 10A, in step S400, each balance slave controller 150 determines whether the battery system 1000 is woken up. If the battery system 1000 is woken up, then the process proceeds to step S402; if the battery system 1000 is not woken up, then the process proceeds to step S401.

As shown in FIG. 10A, in step S401, the balance slave controller 150 determines whether an external abnormality has occurred to forcibly suspended the cell balance process. If the external abnormality occurs, the process is terminated and the cell balance procedure is forcibly suspended; if no external abnormality occurs, the process proceeds to step S403.

As shown in FIG. 10A, in step S402, the balance slave controller 150 performs the initialization operation, and sets the balance state to the off state, and clears all relevant data of the registers of cell balance procedure in the balance slave controller 150.

As shown in FIG. 10A, in step S403, the balance slave controller 150 determines whether the operating state is in the charging state. If the operating state is in the charging state, then the process proceeds to step S404; if the operating state is not in the charging state, then the process is terminated. The balance host controller 310 broadcasts the current measurement value to all of the balance slave controllers 150 through the communication bus 200 because only the host control unit 300 has the system current measurement unit 340 for the battery system 1000. Therefore, the balance slave controller 150 can determine the charging status according to the broadcast the system current information sent by the balance host controller 310.

As shown in FIG. 10A, in step S404, the balance slave controller 150 determines whether the highest voltage of the battery system 1000 rises to the balance reset voltage V0 because each balance slave controller 150 can receive the data package from other balance slave controllers 150 through communication. If the highest voltage has risen to the balance reset voltage V0, then the process proceeds to step S405; if the highest voltage has not risen to the balance reset voltage V0, then the process returns to step S403.

As shown in FIG. 10A, in step S405, the balance slave controller 150 terminates the cell balance procedure and sets the balance state to the balance reset state. The balance reset state includes clearing all the related registers of the balance calculation results and execution, such that the relevant parameters of the cell balance procedure can be recalculated according to the current charge state.

Figure 10B:
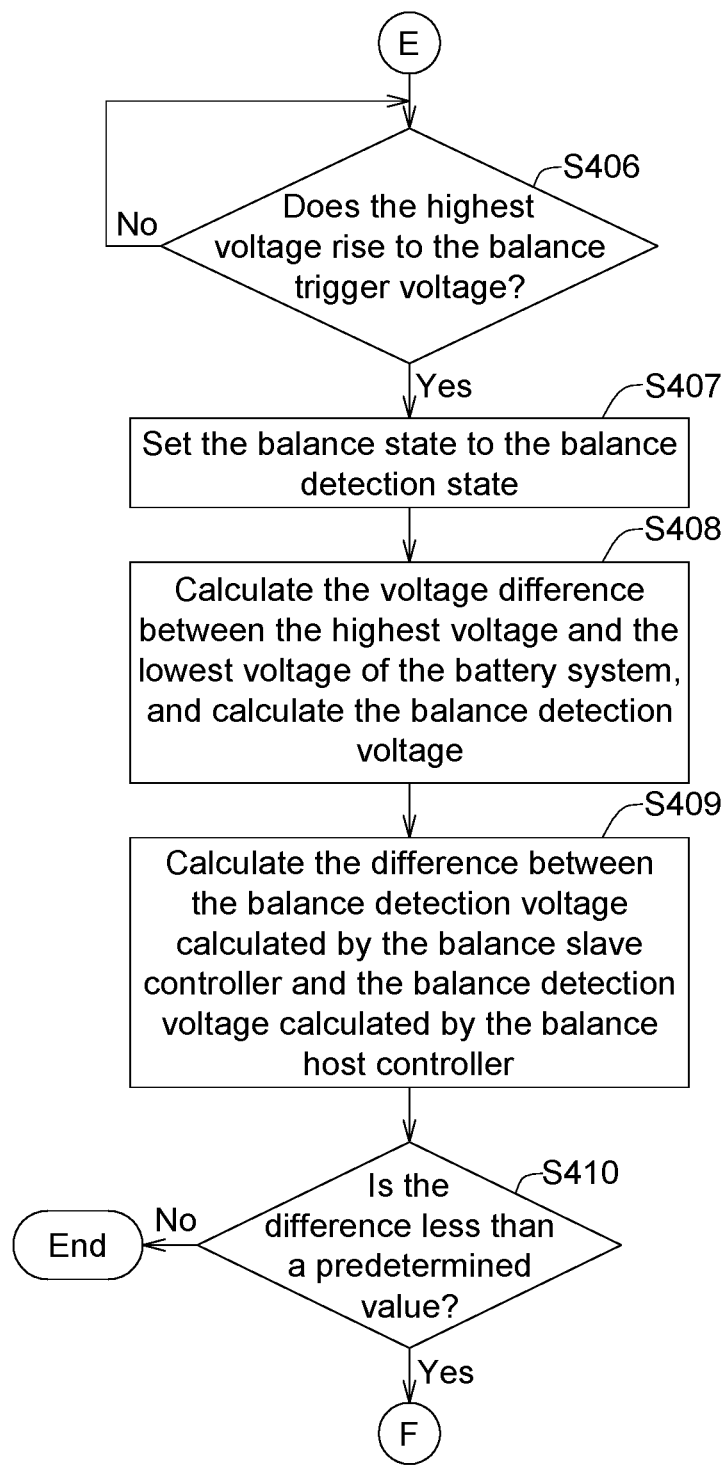

As shown in FIG. 10B, in step S406, the balance slave controller 150 determines whether the highest voltage rises to the balance trigger voltage V1. If the highest voltage rises to the balance trigger voltage V1, then the process proceeds to step S407; if the highest voltage does not rise to the balance trigger voltage V1, then the process proceeds to step S406.

As shown in FIG. 10B, in step S407, the balance slave controller 150 sets the balance state to the balance detection state.

As shown in FIG. 10B, in step S408, the balance slave controller 150 calculates the voltage difference dV between the highest voltage and the lowest voltage of the battery system 1000, and calculates the balance detection voltage V2. All of the balance slave controllers 150 will report the highest voltage and the lowest voltage in the battery units 100 to the balance host controller 310 through communication. All balance slave controller 150 can receive the high voltage and lowest voltage of other battery units 100 from the communication bus 200, so the voltage difference dV and balance detection voltage V2 of battery system 1000 can be calculated by each of the balance slave controller 150. This step is the same as the calculation method of the balance host controller 310 in step S306 of FIG. 9B. Therefore, theoretically, the balance detection voltage V2 calculated by the balance slave controller 150 and the balance detection voltage V2 calculated by the balance host controller 310 should be the same or very closed.

As shown in FIG. 10B, in step S409, the balance slave controller 150 calculates the difference between the balance detection voltage V2 calculated by the balance slave controller 150 and the balance detection voltage V2 calculated by the balance host controller 310.

As shown in FIG. 10B, in step S410, the balance slave controller 150 determines whether the difference is less than a predetermined value. If the difference is less than the predetermined value, it means that all data of the balance procedure between the balance slave controller 150 and the balance host controller 310 is almost the same. Therefore, the process proceeds to step S4101 of FIG. 10C; if the difference is not less than the predetermined value, then the process is terminated. In this way, the control method of the host control unit 300 will be repeated between steps S308 to S309 (see FIG. 9B) until the charging is finished and the battery system 1000 is in the steady state, and the balance state of the balance slave controller 150 will keep in the detection state, so the cell balance procedure will not be activated. The process goes to step S303 to restart the balance procedure if the battery system 1000 is charged again.

In step S4101, the balance slave controller 150 determines whether the highest voltage of cell 110 of the battery system 1000 reaches the balance detection voltage V2. If not, the process returns to step S4101; if yes, the process proceeds to step S4102. The system charging capacity corresponding to the capacity (i.e. obtaining the first capacity Qa in FIG. 6) of highest voltage cell which is recorded to the corresponding temporary register. This step is equivalent to steps S160 and S170 in FIG. 6.

Figure 10C:
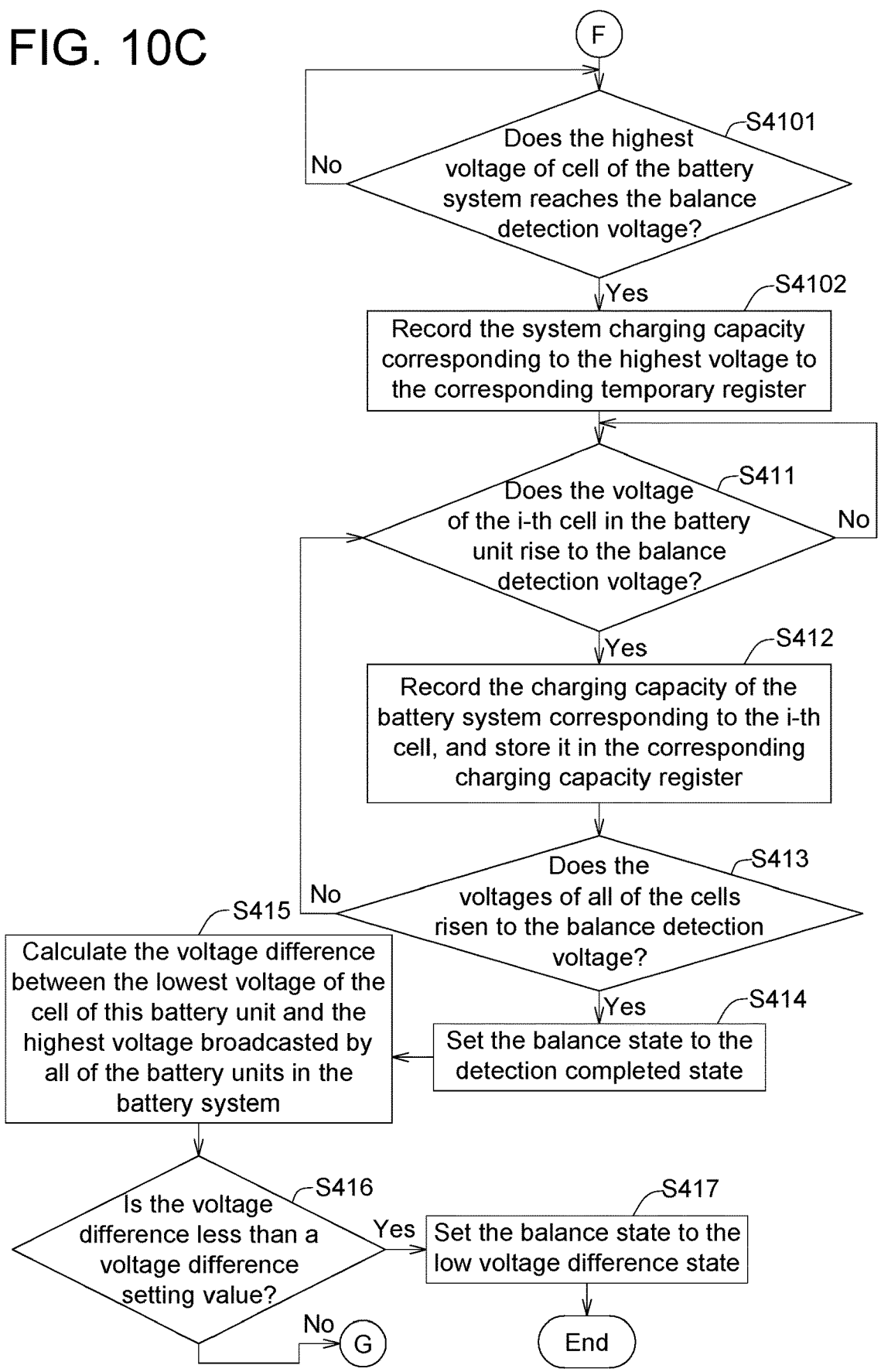

As shown in FIG. 10C, in step S411, the balance slave controller 150 determines whether the voltage of the i-th cell in the battery unit 100 rises to the balance detection voltage V2. If the voltage of the i-th cell rises to the balance detection voltage V2, the process proceeds to step S412; if the voltage of the i-th cell does not rise to the balance detection voltage V2, the returns proceeds to step S411.

As shown in FIG. 10C, in step S412, the balance slave controller 150 records the charging capacity of the battery system corresponding to the i-th cell 110, and stores it in the corresponding charging capacity register. For example, the battery unit 100 may consist of 14 cells connected in series. There have 14 charging capacity registers whose number is "B[1] to B[14]" are set. When the voltage of the second cell first reaches the balance detection voltage V2, the charging capacity of the battery system is "Qb1", and the "Qb1" will be recorded in the charging capacity register numbered "B[2]." Then the voltage of the 10th cell reaches the balance detection voltage V2. At this time, the charging capacity of the battery system is "Qb2", and the "Qb2" will be recorded in the charging capacity register numbered "B[10]." The battery system charging capacity of the 14 cells will be completely stored the second capacity Qb in the charging capacity registers according to the corresponding position of the cells. This step is equivalent to step S180 and step S190 in FIG. 6.

As shown in FIG. 10C, in step S413, the balance slave controller 150 determines whether the voltages of all cells of the battery unit 100 have risen to the balance detection voltage V2. If the voltages of all cells rise to the balance detection voltage V2, then the process proceeds to step S414; if the voltages of all cells do not rise to the balance detection voltage V2, then the process returns to step S411.

As shown in FIG. 10C, in step S414, the balance slave controller 150 sets the balance state to the detection completed state.

As shown in FIG. 10C, in step S415, the balance slave controller 150 calculates the voltage difference dV between the lowest voltage of the cell 110 of this battery unit 100 and the highest voltage broadcasted by all of the battery units 100 in the battery system 1000. The purpose is to evaluate the difference between the highest voltage of this battery unit 100 and the voltage of all of the battery units 100. The severity of voltage outlier can be identified by the voltage difference. The cell balance procedure is needed to be performed for the battery unit 100 with the largest voltage difference. Conversely, the low voltage difference means that this battery units 100 of the battery system 1000 have the good voltage consistency relative to the cell 110 with highest voltage. (that is, the low voltage difference state mentioned in step S417), and thus this battery unit 100 does not need to perform the cell balance procedure.

As shown in FIG. 10C, in step S416, the balance slave controller 150 determines whether the voltage difference dV is less than a voltage difference setting value. If the voltage difference dV is less than the voltage difference setting value, then the process proceeds to step S417; if the voltage difference dV is not less than voltage difference setting value, then the process proceeds to step S418 of FIG. 10D.

As shown in FIG. 10C, in step S417, the balance slave controller 150 sets the balance state to the low voltage difference state.

Figure 10D:
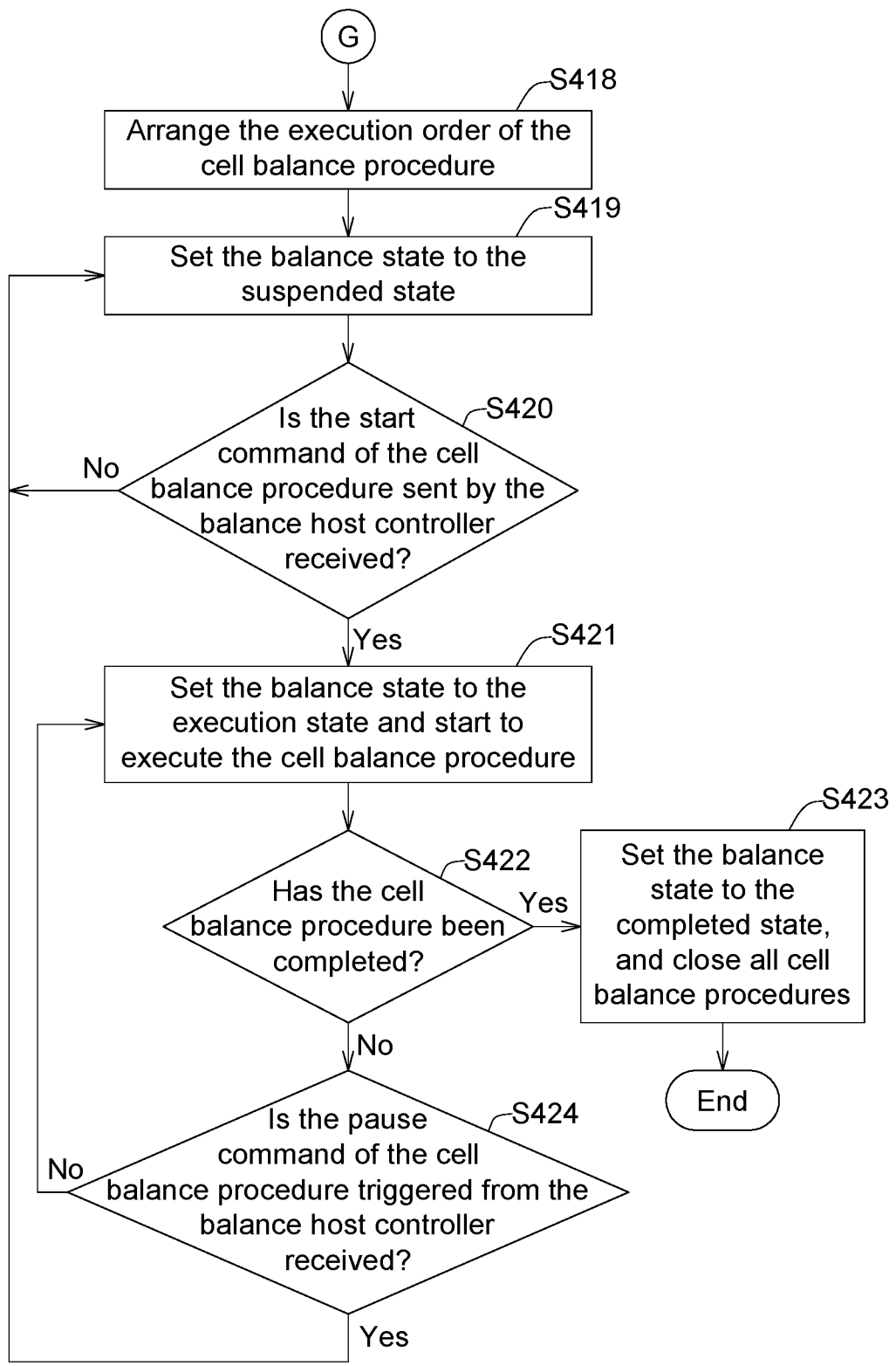

As shown in FIG. 10D, in step S418, the balance slave controller 150 arranges the execution order of the cell balance procedure. The execution order of the cells 110 in one battery unit 100 is: The balance slave controller 150 will first perform the cell balance procedure for those with lower voltage. The execution order of the battery units 100 in the battery system 1000 is: The cell balance procedure will preferentially start at the battery unit 100 with the lowest voltage in the battery system 1000. Therefore, when the output of the balance power supply 400 is limited, the balance charge capacity of the cell 110 is preferentially provided to the cell 110 with the lowest voltage which can quickly reduce the voltage difference of the battery system 1000.

The calculation method of the balance charge capacity Qab for each channel is the same as step S200 in FIG. 6. The balance charge capacity Qab of the i-th cell 110 is the difference between the second capacity Qb stored in the charging capacity register numbered "B[i]" and the first capacity Qa corresponding to the highest voltage. The principle is the same as the balance charge capacity Qab described in FIG. 7. For a battery unit 100 with 14 cells, the 14 balance charge capacities will be generated, which is "Qab[1] to Qab[14]." Each channel supplies the capacity according to its own balance charge capacity Qab. If the 14th cell 110 in the battery unit 100 has the highest voltage, then Qab[14] is equal to zero.

In addition, in all of the battery units 100, the cell 110 with the lowest voltage will be charged with an additional capacity (for example, balance charge capacity Qab+0.5% fully charge capacity). In this way, the cell 110 with the lowest voltage may become the cell 110 with the highest voltage in the battery system 1000 when the next charging. Therefore, the cell balance procedure can replace the cell 110 with the highest voltage in turn, avoiding the problem that the specific cell 110 continues to maintain the highest voltage state and causes battery overcharge failure or accelerated life degradation.

As shown in FIG. 10D, in step S419, the balance slave controller 150 sets the balance state to the suspended state. The suspended state is to wait for the start command of the cell balance procedure sent by the balance host controller 310.

As shown in FIG. 10D, in step S420, the balance slave controller 150 determines whether the start command of the cell balance procedure sent by the balance host controller 310 is received. If the start command of the cell balance procedure triggered by the balance host controller 310 is received, the process proceeds to step S421; if the start command of the cell balance procedure triggered by the balance host controller 310 is not received, then the process returns to step S419.

As shown in FIG. 10D, in step S421, the balance slave controller 150 sets the balance state to the execution state and starts to execute the cell balance procedure.

As shown in FIG. 10D, in step S422, the balance slave controller 150 determines whether the cell balance procedure has been completed. If the cell balance procedure has been completed, the process proceeds to step S423; if the cell balance procedure is not completed, the process proceeds to step S424.

As shown in FIG. 10D, in step S423, the balance slave controller 150 sets the balance state to the completed state, and closes all cell balance procedures.

As shown in FIG. 10D, in step S424, the balance slave controller 150 determines whether the pause command of the cell balance procedure triggered from the balance host controller 310 is received. If the balance slave controller 150 received the pause command from the balance host controller 310, then the balance process returns to step S419; Otherwise, the process returns to step S421. The application timing of the pause command of the cell balance procedure is mainly used when the balance host controller 310 needs to temporarily stop the operation of the cell balance procedure due to the limitation of computing resources or the user's forced suspension.

According to the above process, the host control unit 300 and the battery unit 100 receive information from each other, and both parties perform the same calculation based on the data. The host control unit 300 receives the data and report the status of each of the battery units 100, determines that the status of each of the battery units 100 meets the activation condition, and then turns on the balance host switch 320 to conducting state, and triggers the start command of the cell balance procedure to each of the battery units 100.

If the difference between the balance detection voltage V2 calculated by the battery unit 100 and the balance detection voltage V2 broadcasted by the host control unit 300 is less than the predetermined value (it represented that the battery unit 100 and the host control unit 300 are synchronized) and the start command of the cell balance procedure is received from the host control unit 300, then the cell balance procedure of the battery unit 100 will be started, and the balance slave switch 140 is turned on to conducting state.

The host control unit 300 will check the periodic broadcast information of each of the battery unit 100, and each of the battery units 100 will also check the periodic broadcast information of the host control unit 300. If any party finds that the broadcast information is abnormal and reaches the timeout condition, it will trigger the pause command of the cell balance procedure, the balance host controller 310 will turn off the balance host switch 320 to non-conducting state, the balance slave controller 150 will turn off the balance slave switch 140 to non-conducting state, and close the isolated charger 120.

Based on the above characteristics, the host control unit 300 and each of the battery units 100 have the software cross-check protection function.

In addition, the cell balance procedure considers not only the above control methods by also the following abnormal conditions.

After the balance slave controller 150 completes the cell balance procedure, if the voltage of the cell 110 does not reach the target voltage and exceeds the allowable error range, then the balance slave controller 150 will broadcast the abnormal balance status. When the balance host controller 310 or other balance slave controllers 150 receives any abnormal balance state of the balance slave controller 150, the pause command of the cell balance procedure will be triggered. The balance host controller 310 will turn off the balance host switch 320 to non-conducting state, and the balance slave controller 150 will turn off the corresponding balance slave switch 140 to non-conducting state, and turn off the balance power supply to the isolated charger 120, so that the charging function will stop working, and will continue to remain in the suspended balance state until the inspection is completed.

Furthermore, when the balance host controller 310 or the balance slave controller 150 finds that the temperature rises to the temperature threshold in the cell balance procedure, it will also trigger the pause command of the cell balance procedure. That is, the balance host controller 310 turns off the balance host switch 320 to non-conducting state, and continues to remain in the suspended balance state until the inspection is completed.

Alternatively, when the balance host controller 310 finds that the impact force of the battery system 1000 being impacted exceeds the preset impact value, the balance host controller 310 will also turn off the balance host switch 320 to non-conducting state, trigger the pause command of the cell balance procedure, and continue to maintain a balanced suspension state until the inspection is completed.

In summary, the present disclosure has developed a high-safety, high-performance, low-cost balancing function for high-voltage large battery system, which can be applied to the cascade application of multiple cells. This disclosure not only uses cross-protection of hardware and software to improve safety, but also optimizes the design of balanced hardware to improve reliability. In addition, the optimized design of the balance control strategy improves performance, and provides maintenance and special situation disposal methods to enable it to be quickly overhauled.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A battery system, comprising:
a plurality of battery units, each of which includes:
a plurality of cells;
an isolated charger, configured to provide a balance charge capacity to each of the plurality of cells, for performing a cell balance procedure;
a switch array circuit, disposed between the plurality of cells and the isolated charger;
a balance slave switch, connected between the isolated charger and a balance power supply; and
a balance slave controller, configured to calculate a balance detection voltage, wherein the balance detection voltage is used for calculating the balance charge capacity, the balance slave controller is further configured to control the switch array circuit, such that the isolated charger performs the cell balance procedure for one of the plurality of cells;
a communication bus, connected to the plurality of battery units; and
a host control unit, including:
a balance host controller, connected to the communication bus, wherein the balance host controller and the balance slave controllers interactively transfer battery information via the communication bus, and the balance host controller is further configured to calculate the balance detection voltage;
a balance host switch, for controlling the balance power supply, and wherein the balance host switch is controlled by the balance host controller; and
a system current measurement unit, configured to measure a system current passing through the plurality of battery units which are series connected, and multiply the system current by a time to obtain a system capacity;
wherein when all of the plurality of battery units meet an activation condition, the balance host controller turns on the balance host switch to conducting state;
the balance slave switch of each battery unit is turned on to conducting state by the balance slave controller corresponding thereto when a difference between the balance detection voltage calculated by each of the balance slave controller and the balance detection voltage calculated by the balance host controller is less than a predetermined value, and one of the plurality of battery units is applied cell balance power when both of the balance slave switch thereof and the balance host switch are turned on to conducting state;
when the cell balance procedure is being performed and the balance host controller detects data packet transferred delay from the balance slave controller, the balance host controller turns off the balance host switch to non-conducting state; when one of the balance slave controllers detects the data packet transferred delay from the balance host controller, the balance slave controller turns off the balance slave switch corresponding thereto to non-conducting state.

2. The battery system according to claim 1, wherein each of the switch array circuits includes:
a plurality of connecting switches, wherein two ends of each of the plurality of cells are electrically connected to two of the plurality of connecting switches to form a channel;
two circuit buses, connected to the plurality of connecting switches; and
a plurality of polarity switches, connected between the isolated charger and the circuit buses, such that two ends of each of the plurality of cells which are being performed the cell balance procedure and the isolated charger have corresponding polarity.

3. The battery system according to claim 2, wherein each of the plurality of battery units further includes:
a plurality of channel fuses, connected to the plurality of connecting switches, wherein when an exception occurred at one of the plurality of connecting switches, one of the plurality of channel fuses connected thereto is melt and cuts off the channel corresponding thereto to non-conducting state.

4. The battery system according to claim 3, wherein each of the plurality of battery units further includes:
a balance current measurement unit, connected between the isolated charger and the switch array circuit, for measuring a balance current of each of the channels.

5. The battery system according to claim 4, wherein the balance slave controllers respectively determine whether one of the plurality of channel fuses is melt according to the balance currents.

6. The battery system according to claim 1, wherein the balance slave controllers and the balance host controller calculate the balance charge capacity when the battery system is charged.

7. The battery system according to claim 1, wherein the balance slave controllers and the balance host controller calculate the balance charge capacity when the battery system is in a steady state.

8. The battery system according to claim 1, wherein when the cell balance procedure is completed and a cell voltage of one of the plurality of cells does not reach a target voltage and a difference between the cell voltage and the target voltage is larger than a predetermined range, one of the balance slave controllers corresponding thereto turns off one of the balance slave switches connected thereto to non-conducting state and keeps this one of the plurality of cells in a pause balance state until repaired.

9. The battery system according to claim 1, wherein when a temperature reaches a temperature threshold during the cell balance procedure, the balance host controller turns off the balance host switch to non-conducting state and keeps the battery system in a pause balance state until repaired.

10. The battery system according to claim 1, wherein when an impact force of the battery system exceeds a preset impact value, the balance host controller turns off the balance host switch to non-conducting state and keeps the battery system in a pause balance state until repaired.

11. A calculation method of the balance charge capacity, wherein for balancing the plurality of cells of the battery system according to claim 1, the balance charge capacity is provided for one of the plurality of cells, the plurality of cells have a highest voltage and a lowest voltage, and the calculation method comprises:
resetting a register data in the cell balance procedure when the highest voltage rises to a balance reset voltage;
calculating a voltage difference between the highest voltage and the lowest voltage when the highest voltage rises to a balance trigger voltage;
obtaining the balance detection voltage by subtracting a product of the voltage difference and a safety factor from a single cell constant voltage charging set value, wherein the single cell constant voltage charging set value is a charging voltage limitation when one of the plurality of cells is charging from a constant current charging mode to a constant voltage charging mode;

recording the system capacity of the battery system as a first capacity when the highest voltage rises to the balance detection voltage;

recording the system capacity of the battery system as a second capacity when voltage of any one of the plurality of cells rises the balance detection voltage; and calculating a difference between the first capacity and the second capacity to obtain the balance charge capacity.

12. The calculation method according to claim 11, wherein the balance trigger voltage is higher than the balance reset voltage.

13. The calculation method according to claim 11, wherein the balance detection voltage is higher than the balance trigger voltage.

14. A control method of a cell balance procedure of a battery system, wherein the battery system includes a plurality of battery units, a communication bus and a host control unit, each of the plurality of battery units includes a plurality of cells, an isolated charger, a switch array circuit, a balance slave switch, a balance slave controller and a balance current measurement unit, the isolated charger is configured to provide a balance charge capacity to each of the plurality of cells, for performing the cell balance procedure, the switch array circuit is disposed between the plurality of cells and the isolated charger, the balance slave switch is connected between the isolated charger and a balance power supply, the balance slave controller is configured to calculate a balance detection voltage, the balance detection voltage is used for calculating the balance charge capacity, the balance slave controller is further configured to control the switch array circuit, such that the isolated charger performs the cell balance procedure for one of the plurality of cells, the balance current measurement unit measures a current of each of the plurality of cells, the balance charge capacity is a product of the current of each of the plurality of cells and a time, the communication bus is connected to the plurality of battery units via the balance slave controller, the host control unit includes a balance host controller, a system current measurement unit and a balance host switch, the balance host controller is connected to the communication bus, the balance host controller and the balance slave controller interactively transfer battery information via the communication bus, the balance host controller is further configured to calculate a system current, a system capacity and the balance detection voltage, the balance host switch is connected to the balance host controller, and the control method comprises:

turning on the balance host switch to conducting state by the balance host controller when all of the plurality of battery units meet an activation condition;

turning on one of the balance slave switches to conducting state by the balance slave controller corresponding thereto when a difference between the balance detection voltage calculated by the balance slave controller and the balance detection voltage calculated by the balance host controller is less than a predetermined value;

turning off the balance host switch to non-conducting state by the balance host controller and keeping the battery system in a pause balance state until repaired when the balance host controller detects data packet transferred delay from the balance slave controllers; and turning off one of the balance slave switches to non-conducting state by the balance slave controller corresponding thereto and keeping the battery system at the pause balance state until repaired when the balance slave controllers detects the data packet transferred delay from the balance host controller.

15. The control method according to claim 14, wherein the balance slave controllers and the balance host controller calculate the balance charge capacity when the battery system is in a steady state.

16. The control method according to claim 14, when the battery system is in a steady state, the balance slave controllers and the balance host controller calculate the balance charge capacity of one of the plurality of cells whose voltage is not the highest according to a lookup table recording a relationship between a capacity and an open circuit voltage.

17. The control method according to claim 14, further comprising:

turning off one of the balance slave switches to non-conducting state by the balance slave controllers connected thereto and keeping this one of the plurality of cells in a pause balance state until repaired when the cell balance procedure is completed and a cell voltage of one of the cells does not reach a target voltage and a difference between the cell voltage and the target voltage is larger than a predetermined range.

18. The control method according to claim 14, further comprising:

turning off the balance host switch to non-conducting state by the balance host controller and keeping the battery system in a pause balance state until repaired when a temperature reaches a temperature threshold during the cell balance procedure.

19. The control method according to claim 14, further comprising:

turning off the balance host switch to non-conducting state by the balance host controller and keeps the battery system in a pause balance state until repaired when an impact force of the battery system exceeds a preset impact value.

* * * * *